US012574710B2

(12) United States Patent
Peng

(10) Patent No.: US 12,574,710 B2
(45) Date of Patent: Mar. 10, 2026

(54) COMMUNICATION METHOD, COMMUNICATION APPARATUS, AND COMPUTER-READABLE STORAGE MEDIUM

(71) Applicant: HUAWEI TECHNOLOGIES CO., LTD., Shenzhen (CN)

(72) Inventor: Wenjie Peng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 549 days.

(21) Appl. No.: 18/159,277

(22) Filed: Jan. 25, 2023

(65) Prior Publication Data

US 2023/0171567 A1 Jun. 1, 2023

Related U.S. Application Data

(63) Continuation of application No. PCT/CN2020/105949, filed on Jul. 30, 2020.

(51) Int. Cl.
*H04W 4/08* (2009.01)
*H04W 8/18* (2009.01)

(52) U.S. Cl.
CPC ............. *H04W 4/08* (2013.01); *H04W 8/186* (2013.01)

(58) Field of Classification Search
None
See application file for complete search history.

(56) References Cited

U.S. PATENT DOCUMENTS 11,671,880 B2 * 6/2023 Wei .................. H04W 36/0058
455/436
2004/0008657 A1 1/2004 Lee et al.
(Continued)

FOREIGN PATENT DOCUMENTS

CN 104902443 A 9/2015
CN 105589506 A 5/2016
(Continued)

OTHER PUBLICATIONS

3Gpp, Application layer support for Vehicle-to-Everything (V2X) services; Functional architecture and information lows, (Release 16), 3GPP Ts 23.286 V16.3.0, 2020-03-30; 64 total pages.
(Continued)

*Primary Examiner* — Christopher T Wyllie
(74) *Attorney, Agent, or Firm* — Rimon PC

(57) ABSTRACT

Embodiments of the present disclosure disclose a communication method, a communication apparatus, and a computer-readable storage medium. The method includes receiving M pieces of first information from M first terminal devices of a second terminal device, where the M pieces of first information are in a one-to-one correspondence with the M first terminal devices, the first information corresponds to at least one service, and the at least one service is a service that a first terminal device of the M first terminal devices is interested in. The method further includes sending at least one piece of group information to the second terminal device, where the group information includes second information and third information, and the second information includes information about N second terminal devices in the M first terminal devices. In embodiments of the present disclosure, transmission resources can be saved and transmission efficiency can be improved.

20 Claims, 16 Drawing Sheets

(56) References Cited

U.S. PATENT DOCUMENTS

| | | | | |
|---|---|---|---|---|
| 2013/0044623 A1* | 2/2013 | Speight | .............. | H04B 7/15528 |
| | | | | 370/252 |
| 2020/0092685 A1* | 3/2020 | Fehrenbach | .......... | H04W 72/23 |
| 2020/0100048 A1* | 3/2020 | Wu | ......................... | H04W 4/02 |
| 2020/0163005 A1 | 5/2020 | Rao et al. | | |
| 2020/0259600 A1* | 8/2020 | Cao | ...................... | H04L 1/0057 |
| 2021/0127404 A1* | 4/2021 | Ryu | .................. | H04W 72/1263 |
| 2021/0176820 A1* | 6/2021 | Zhang | .................. | H04W 8/005 |
| 2021/0235217 A1* | 7/2021 | Hovey | .................. | H04W 4/022 |
| 2021/0298039 A1* | 9/2021 | Yuan | ................. | H04W 72/0453 |
| 2021/0306824 A1* | 9/2021 | Li | ......................... | H04W 72/02 |
| 2021/0337509 A1* | 10/2021 | Selvanesan | ........... | H04W 72/02 |
| 2022/0368455 A1* | 11/2022 | Schellmann | .......... | H04L 1/0026 |
| 2023/0069425 A1* | 3/2023 | Zhao | ..................... | H04W 72/20 |
| 2023/0171567 A1* | 6/2023 | Peng | ..................... | H04W 8/186 |
| | | | | 370/312 |

FOREIGN PATENT DOCUMENTS

| | | | | |
|---|---|---|---|---|
| CN | 111148074 A | 5/2020 | | |
| CN | 111385844 A | 7/2020 | | |
| GB | 2581492 A * | 8/2020 | ............ | H04W 92/18 |
| WO | WO-2018202797 A1 * | 11/2018 | ............ | H04W 76/14 |

OTHER PUBLICATIONS

3Gpp, Study on enhancements to application layer support for V2X services, (Release 17), 3GPP Tr 23.764 V1.0.0, 2020-06-30; 35 total pages.

* cited by examiner

601

Data of an
MBS

602

603

Data of the MBS

COMMUNICATION METHOD, COMMUNICATION APPARATUS, AND COMPUTER-READABLE STORAGE MEDIUM

CROSS-REFERENCE TO RELATED APPLICATIONS

This application is a continuation of International Application No. PCT/CN2020/105949, filed on Jul. 30, 2020, the disclosure of which is hereby incorporated by reference in its entirety.

TECHNICAL FIELD

Embodiments of the present disclosure generally relate to the field of communication technologies, and in particular, to a communication method, a communication apparatus, and a computer-readable storage medium.

BACKGROUND

In a user equipment (UE)-to-network relay system, remote UE may establish control plane and user plane connections to a network device through relay UE, to communicate with the network device. Information between the network device and the remote UE is transmitted in a unicast mode. The relay UE, used as an intermediate node between the network device and the remote UE, is not aware of the information transmitted between the remote UE and the network device, and is only used to forward the information.

SUMMARY

Embodiments of the present disclosure disclose a communication method, a communication apparatus, and a computer-readable storage medium, to save transmission resources and improve transmission efficiency.

According to a first aspect, a communication method is disclosed. The method may be applied to a network device, or may be applied to a module (for example, a chip) in the network device. The method may include: receiving M pieces of first information from M second terminal devices of a first terminal device; and sending at least one piece of group information to the first terminal device. The M pieces of first information are in a one-to-one correspondence with the M second terminal devices, the first information corresponds to at least one service, the at least one service is a service that the second terminal device of the M second terminal devices is interested in, the group information may include second information and third information, the second information may include information about N second terminal devices in the M second terminal devices, the third information may include information about at least one common service, the common service is a common=service in at least N services, M is an integer greater than 1, and N is an integer greater than 1 and less than or equal to M.

In some embodiments, after receiving information about services that a plurality of second terminal devices are interested in, the network device may send the at least one piece of group information to the first terminal device, so that the first terminal device may allocate a group identifier to each of the at least one piece of group information, to create a multicast path for a service corresponding to the group identifier. After receiving data from the network device, the first terminal device may identify a service corresponding to the data. When the service corresponding to the data is the service corresponding to the group identifier, the first terminal device may send, in a multicast mode, the data of the service to each of the plurality of second terminal devices corresponding to the group identifier. The first terminal device is relay user equipment (UE), and the second terminal device is remote UE. It can be learned that the first terminal device may identify the service corresponding to the data, to resolve a conventional-technology technical problem that the relay UE is not aware of information transmitted between the network device and the remote UE. Because the first terminal device may be aware of the data from the network device, when the data sent by the network device is data of a service to be transmitted on a previously established multicast path, the first terminal device may send the data to the plurality of second terminal devices in the multicast mode, and only one transmission resource is required to send the data to the plurality of second terminal devices in the multicast mode. This reduces a quantity of required transmission resources, and therefore transmission resources can be saved. In addition, because the first terminal device does not need to send the data to each of the plurality of second terminal devices in a unicast mode, the first terminal device may send the data to the plurality of second terminal devices in the multicast mode at a time. This reduces time for sending the data, and therefore transmission efficiency can be improved and a quantity of times for sending the data can be reduced. Therefore, signaling, messages, and the like used for data transmission can be reduced, thereby further saving transmission resources.

In a possible implementation, the group information may further include an air interface bearer configuration and/or an air interface physical resource configuration, the air interface bearer configuration is used to establish an air interface bearer, the air interface bearer is used to receive data of the at least one common service, and the air interface physical resource configuration is used to receive the data of the at least one common service.

In some embodiments, the network device may further send the air interface bearer configuration and/or the air interface physical resource configuration to the first terminal device, so that the first terminal device may establish, based on the air interface bearer configuration, the air interface bearer used to receive the data, and/or determine, based on the air interface physical resource, a physical resource used to receive the data, to improve data receiving efficiency.

In a possible implementation, the group information may further include a multicast configuration, the multicast configuration may include a first sidelink (SL) bearer configuration, the first SL bearer configuration is used to establish a first SL bearer, and the first SL bearer is used to send the data of the at least one common service.

In some embodiments, the network device may further send the multicast configuration including the SL bearer configuration to the first terminal device, so that the first terminal device may establish, based on the SL bearer configuration, the SL bearer used to send the data, to improve data transmission efficiency.

In a possible implementation, when the third information includes information about a plurality of common services, that the first SL bearer configuration is used to establish a first SL bearer may include: the first SL bearer configuration is used to establish a plurality of first SL bearers; and that the first SL bearer is used to send the data of the at least one common service may include: each of the plurality of first SL bearers is used to send data of one of the at least one common service.

In some embodiments, because each of the plurality of SL bearers is used to send the data of only one service, after receiving the data through one SL bearer, the second terminal device may be prevented from identifying data of different services in the received data, to improve receiving efficiency of the second terminal device and reduce power consumption of the second terminal device.

In a possible implementation, the communication method may further include: receiving first indication information from the first terminal device, where the first indication information is used to indicate a correspondence between the group information and a first identifier, and the first identifier is a group identifier.

In some embodiments, the network device may further receive group identifiers corresponding to different group information reported by the first terminal device for subsequent invocation, for example, used to update the SL bearer configuration.

In a possible implementation, the communication method may further include: sending, through the first terminal device, the first identifier and information about a service corresponding to the first identifier to each of the N second terminal devices.

In some embodiments, the network device may send, through the first terminal device, the group identifier and information about a service corresponding to the group identifier to the plurality of second terminal devices corresponding to the group identifier, so that the plurality of second terminal devices may receive the data of the corresponding service in the multicast mode based on the group identifier.

In a possible implementation, the at least one common service belongs to a multicast broadcast service (MBS).

In some embodiments, the first terminal device may be aware of data of the MBS, and send the data of the MBS to the plurality of second terminal devices in the multicast mode, so that the data of the MBS may be transmitted between the network device and the second terminal device.

According to a second aspect, a communication method is disclosed. The method may be applied to a first terminal device, or may be applied to a module (for example, a chip) in the first terminal device. The method may include: receiving at least one piece of group information from a network device; allocating a first identifier to each of the at least one piece of group information; and sending the first identifier and information about a service corresponding to the first identifier to each of N second terminal devices. The group information may include second information and third information, the second information may include information about the N second terminal devices, the third information may include information about at least one common service, the N second terminal devices are in a one-to-one correspondence with N pieces of first information, the first information corresponds to at least one service, the at least one service is a service that the second terminal device of the M second terminal devices is interested in, the common service is a common service in at least N services, the first identifier is a group identifier, and N is an integer greater than 1.

In some embodiments, the first terminal device may receive the at least one piece of group information sent by the network device, and may allocate a group identifier to each of the at least one piece of group information, to create a multicast path for a service corresponding to the group identifier. After receiving data from the network device, the first terminal device may identify a service corresponding to the data. When the service corresponding to the data is the service corresponding to the group identifier, the first terminal device may send, in a multicast mode, the data of the service to each of a plurality of second terminal devices corresponding to the group identifier. It can be learned that the first terminal device may identify the service corresponding to the data, to resolve a conventional-technology technical problem that relay UE is not aware of information transmitted between the network device and remote UE. Because the first terminal device may be aware of the data from the network device, when the data sent by the network device is data of a service to be transmitted on a previously established multicast path, the first terminal device may send the data to the plurality of second terminal devices in the multicast mode, and does not need to send the data to each of the plurality of second terminal devices in a unicast mode. Therefore, only one transmission resource is required to send the data to the plurality of second terminal devices in the multicast mode, to save transmission resources. In addition, because the first terminal device does not need to send the data to each of the plurality of second terminal devices in the unicast mode, the first terminal device may send the data to the plurality of second terminal devices in the multicast mode at a time. This reduces time for sending the data by the first terminal device, and therefore transmission efficiency can be improved and a quantity of times for sending the data by the first terminal device can be reduced. Therefore, signaling, messages, and the like used for data transmission can be reduced, and a quantity of times for exchanging signaling, messages, and the like between the first terminal device and the second terminal device can be reduced, thereby further saving transmission resources In a possible implementation, the group information may further include an air interface bearer configuration and/or an air interface physical resource configuration, and the communication method may further include: establishing an air interface bearer based on the air interface bearer configuration, and receiving data of the at least one common service from the network device through the air interface bearer; and determining a physical resource based on the air interface physical resource configuration, and receiving the data of the at least one common service from the network device through the physical resource.

In some embodiments, the first terminal device may further receive the air interface bearer configuration and/or the air interface physical resource configuration from the network device, and may establish, based on the air interface bearer configuration, the air interface bearer used to receive the data, and/or may determine, based on the air interface physical resource, the physical resource used to receive the data, to improve data receiving efficiency.

In a possible implementation, the group information may further include a multicast configuration, the multicast configuration may include a first SL bearer configuration, and the communication method may further include: establishing a first SL bearer based on the first SL bearer configuration, where the first SL bearer is used to send the data of the at least one common service.

In some embodiments, the first terminal device may further receive, from the network device, the multicast configuration including the SL bearer configuration, and may establish, based on the SL bearer configuration, the SL bearer used to send the data to the second terminal device, to improve data transmission efficiency.

In a possible implementation, when the third information includes information about a plurality of common services, the establishing of a first SL bearer based on the first SL bearer configuration may include: establishing a plurality of first SL bearers based on the first SL bearer configuration; and that the first SL bearer is used to send the data of the at least one common service may include: each of the plurality of first SL bearers is used to send data of one of the at least one common service.

In some embodiments, because each of the plurality of SL bearers is used to send the data of only one service, after receiving the data through one SL bearer, the second terminal device may be prevented from identifying data of different services in the received data, to improve receiving efficiency of the second terminal device and reduce power consumption of the second terminal device.

In a possible implementation, the communication method may further include: sending a second SL bearer configuration to each of the N second terminal devices, where the second SL bearer configuration is used to establish a second SL bearer, the second SL bearer is used to receive the data of the at least one common service, and the first SL bearer configuration includes the second SL bearer configuration.

In some embodiments, the first terminal device may further send the SL bearer configuration to the second terminal device, so that the second terminal device may establish, based on the SL bearer configuration, the SL bearer used to receive the data, to improve data transmission efficiency.

In a possible implementation, the allocating a first identifier to each of the at least one piece of group information may include: sending second indication information to an upper layer through an access stratum (AS), where the second indication information is used to request the upper layer to allocate the group identifier; and allocating the first identifier through the upper layer based on the second indication information.

In some embodiments, the upper layer of the first terminal device may allocate the group identifier to the group information based on the indication information sent by the AS of the first terminal device.

In a possible implementation, the communication method may further include: sending first indication information to the network device, where the first indication information is used to indicate a correspondence between the group information and the first identifier.

In some embodiments, the first terminal device may further report group identifiers corresponding to different group information to the network device for subsequent invocation for the network device, for example, used to update the SL bearer configuration.

In a possible implementation, the sending the first identifier and information about a service corresponding to the first identifier to each of N second terminal devices may include: sending first indication information to the network device, where the first indication information is used to indicate a correspondence between the group information and the first identifier, and the first indication information is used by the network device to send, through the first terminal device, the first identifier and the information about the service corresponding to the first identifier to each of the N second terminal devices.

In some embodiments, the first terminal device may send, through the network device, the group identifier and the information about the service corresponding to the group identifier to the second terminal device, so that the second terminal device may receive the data of the corresponding service in the multicast mode based on the group identifier.

In a possible implementation, the at least one common service belongs to an MBS.

In some embodiments, the first terminal device may be aware of data of the MBS, and send the data of the MBS to the plurality of second terminal devices in the multicast mode, so that the data of the MBS may be transmitted between the network device and the second terminal device.

According to a third aspect, a communication method is disclosed. The method may be applied to a first terminal device, or may be applied to a module (for example, a chip) in the first terminal device. The method may include: receiving M pieces of first information of M second terminal devices; and sending at least one first identifier and information about a service corresponding to the first identifier to each of N second terminal devices. The M pieces of first information are in a one-to-one correspondence with the M second terminal devices, the first information corresponds to at least one service, the at least one service is a service that the second terminal device of the M second terminal devices is interested in, the M second terminal devices include the N second terminal devices, the first identifier is a group identifier of a corresponding group, the first identifier corresponds to third information, the third information may include information about at least one common service, the common service is a common service in at least N services, the information about the service corresponding to the first identifier is the information included in the third information, M is an integer greater than 1, and N is an integer greater than 1 and less than or equal to M.

In some embodiments, after receiving information about services that a plurality of second terminal devices are interested in, the first terminal device may send the group identifier and the third information corresponding to the group identifier to a part of or all of the plurality of second terminal devices, so that the first terminal device may create a multicast path between the first terminal device and the plurality of second terminal devices for a service corresponding to the group identifier. After receiving data from a network device, the first terminal device may identify a service corresponding to the data. When the service corresponding to the data is the service corresponding to the group identifier, the first terminal device may send, in a multicast mode, the data to each of the plurality of second terminal devices corresponding to the group identifier. It can be learned that the first terminal device may identify the service corresponding to the data, to resolve a conventional-technology technical problem that relay UE is not aware of information transmitted between the network device and remote UE. After the first terminal device receives the data from the network device, when the data sent by the network device is data of a service to be transmitted on a previously established multicast path, the first terminal device may send the data to the plurality of second terminal devices in the multicast mode, and does not need to send the data to each of the plurality of second terminal devices. Therefore, only one transmission resource is required to send the data to the plurality of second terminal devices, so that resources used for sending the data can be reduced, thereby saving transmission resources. In addition, because the first terminal device does not need to send the data to each of the plurality of second terminal devices in a unicast mode, the first terminal device may send the data to the plurality of second terminal devices in the multicast mode. This reduces time for sending the data by the first terminal device, and therefore transmission efficiency can be improved and a quantity of times for sending the data by the first terminal device can be reduced. Therefore, signaling, messages, and the like used for data transmission can be reduced, and a quantity of times for exchanging signaling, messages, and the like between the first terminal device and the second terminal device can be reduced, thereby further saving transmission resources In a possible implementation, the receiving M pieces of first information of M second terminal devices may include: receiving the M pieces of first information from the M second terminal devices; or receiving the M pieces of first information from the M second terminal devices of the network device, where the M pieces of first information are sent by the M second terminal devices to the network device through a same first terminal device.

In some embodiments, the first terminal device may receive, from the second terminal device, information about a service that the second terminal device of the M second terminal devices is interested in, or may receive, from the network device, information about a service that the second terminal device is interested in.

In a possible implementation, the communication method may further include: sending at least one piece of group information to the network device, where the group information may include the third information; receiving a multicast configuration corresponding to each of the at least one piece of group information from the network device, where the multicast configuration may include a first SL bearer configuration; and establishing a first SL bearer based on the first SL bearer configuration, where the first SL bearer is used to send data of the at least one common service.

In some embodiments, the first terminal device may send the group information to the network device, so that the network device configures an SL bearer configuration for a service corresponding to each piece of group information, and the first terminal device may establish, based on the SL bearer configuration, an SL bearer used to send the data, to improve data transmission efficiency.

In a possible implementation, when the third information includes information about a plurality of common services, the establishing a first SL bearer based on the first SL bearer configuration may include: establishing a plurality of first SL bearers based on the first SL bearer configuration; and that the first SL bearer is used to send data of the at least one common service includes: each of the plurality of first SL bearers is used to send data of one of the at least one common service.

In some embodiments, because each of the plurality of SL bearers is used to send the data of only one service, after receiving the data through one SL bearer, the second terminal device may be prevented from identifying data of different services in the received data, to improve receiving efficiency of the second terminal device and reduce power consumption of the second terminal device.

In a possible implementation, the communication method may further include: sending a second SL bearer configuration to each of the N second terminal devices, where the second SL bearer configuration is used to establish a second SL bearer, the second SL bearer is used to receive the data of the at least one common service, and the first SL bearer configuration includes the second SL bearer configuration.

In some embodiments, the first terminal device may further send the SL bearer configuration to the second terminal device, so that the second terminal device may establish, based on the SL bearer configuration, the SL bearer used to receive the data, to improve data transmission efficiency.

In a possible implementation, the group information may further include the first identifier.

In some embodiments, the first terminal device may further report group identifiers corresponding to different group information to the network device for subsequent invocation for the network device, for example, used to update the SL bearer configuration.

In a possible implementation, the communication method may further include: creating at least one group.

In some embodiments, after receiving the information about the services that the plurality of second terminal devices are interested in, the first terminal device may create the at least one group, so that the first terminal device may separately perform multicast transmission on data of services corresponding to different groups.

In a possible implementation, the creating at least one group may include: determining the at least one group; and allocating the first identifier to each of the at least one group.

In a possible implementation, the allocating the first identifier to each of the at least one group may include: sending second indication information to an upper layer through an AS, where the second indication information is used to request to allocate the group identifier; and allocating the first identifier through the upper layer based on the second indication information.

In some embodiments, the upper layer of the first terminal device may allocate the group identifier to the group information based on the indication information sent by the AS of the first terminal device.

In a possible implementation, the at least one common service belongs to an MBS.

In some embodiments, the first terminal device may be aware of data of the MBS, and send the data of the MBS to the plurality of second terminal devices in the multicast mode, so that the data of the MBS may be transmitted between the network device and the second terminal device.

According to a fourth aspect, a communication method is disclosed. The method may be applied to a network device, or may be applied to a module (for example, a chip) in the network device. The method may include: receiving at least one piece of group information from a first terminal device; and sending, to the first terminal device, a multicast configuration corresponding to each of the at least one piece of group information. The group information may include third information, the third information may include information about at least one common service, N second terminal devices are in a one-to-one correspondence with N pieces of first information, the first information corresponds to at least one service, the at least one service is a service that the second terminal device of the M second terminal devices is interested in, the common service is a common service in at least N services, the multicast configuration may include first SL bearer configuration, the first SL bearer configuration is used to establish a first SL bearer, the first SL bearer is used to send data of the at least one common service, and N is an integer greater than 1.

In some embodiments, the network device may receive the group information from the first terminal device, and may configure an SL bearer configuration for a service corresponding to each piece of group information, so that the first terminal device may establish, based on the SL bearer configuration, an SL bearer used to send the data, to improve data transmission efficiency.

In a possible implementation, when the third information includes information about a plurality of common services, that the first SL bearer configuration is used to establish a first SL bearer may include: The first SL bearer configuration is used to establish a plurality of first SL bearers; and that the first SL bearer is used to send data of the at least one common service may include: each of the plurality of first SL bearers is used to send data of one of the at least one common service.

In some embodiments, because each of the plurality of SL bearers is used to send the data of only one service, after receiving the data through one SL bearer, the second terminal device may be prevented from identifying data of different services in the received data, to improve receiving efficiency of the second terminal device and reduce power consumption of the second terminal device.

In a possible implementation, before the receiving at least one piece of group information from a first terminal device, the communication method may further include: receiving M pieces of first information sent by M second terminal devices through the first terminal device; and sending the M pieces of first information to the first terminal device, where the M pieces of first information are in a one-to-one correspondence with the M second terminal devices, the M second terminal devices include the N second terminal devices, and M is an integer greater than or equal to N.

In some embodiments, after receiving information, about a service that the second terminal device of the M second terminal devices is interested in, that is sent by the second terminal device through the first terminal device, the network device may forward the information to the first terminal device.

In a possible implementation, the group information may further include a first identifier, the first identifier is used to identify a group corresponding to the group information, and the first identifier is a group identifier.

In some embodiments, the network device may further receive group identifiers corresponding to different group information reported by the first terminal device for subsequent invocation, for example, used to update the SL bearer configuration.

In a possible implementation, the at least one common service belongs to an MBS.

In some embodiments, the first terminal device may be aware of data of the MBS, and send the data of the MBS to a plurality of second terminal devices in a multicast mode, so that the data of the MBS may be transmitted between the network device and the second terminal device.

According to a fifth aspect, a communication method is disclosed. The method may be applied to a second terminal device, or may be applied to a module (for example, a chip) in the second terminal device. The method may include: sending first information; and receiving data of at least one common service from a first terminal device in a multicast mode based on a first identifier. The first information corresponds to at least one service, the at least one service is a service that the second terminal device of the M second terminal devices is interested in, the first identifier corresponds to third information, the third information includes information about at least one common service, N second terminal devices are in a one-to-one correspondence with N pieces of first information, the common service is a common service in at least N services, the N second terminal devices include the second terminal device, and the first identifier is a group identifier of a corresponding group.

In some embodiments, the second terminal device may send information about the service of interest, so that the second terminal device may create a multicast path between the second terminal device and the first terminal device for a service corresponding to the group identifier, and may receive data of the service from the first terminal device in the multicast mode based on the group identifier. It can be learned that when data that is sent by a network device and that is received by the first terminal device is data of a service to be transmitted on a previously established multicast path, the first terminal device may send the data to a plurality of second terminal devices in the multicast mode, so that transmission resources can be reduced. In addition, because the first terminal device does not need to send the data to the plurality of second terminal devices in a unicast mode, the first terminal device may send the data to the plurality of second terminal devices in the multicast mode. This reduces time and a quantity of times for sending the data by the first terminal device, and therefore transmission efficiency can be improved.

In a possible implementation, the communication method may further include: receiving the first identifier and information about a service corresponding to the first identifier.

In some embodiments, the second terminal device may receive the group identifier and information about the service corresponding to the group identifier, so that the second terminal device may receive the data of the service from the first terminal device in the multicast mode based on the group identifier.

In a possible implementation, the sending information may include: sending the first information to the network device through the first terminal device; or sending the first information to the first terminal device.

In some embodiments, the second terminal device may send the information about the service of interest to the first terminal device, or may send the information to the network device.

In a possible implementation, the receiving the first identifier and information about a service corresponding to the first identifier may include: receiving, from the first terminal device in the unicast mode, the first identifier and the information about the service corresponding to the first identifier; or receiving, through the first terminal device from the network device, the first identifier and the information about the service corresponding to the first identifier.

In some embodiments, the second terminal device may receive the group identifier and the information about the service corresponding to the group identifier, which may be sent by the first terminal device, or may be sent by the network device.

In a possible implementation, the communication method may further include: receiving a second sidelink SL bearer configuration from the first terminal device; and establishing a second SL bearer based on the second SL bearer configuration; and the receiving data of at least one common service from a first terminal device in a multicast mode based on a first identifier may include: receiving the data of the at least one common service from the first terminal device through the second SL bearer in the multicast mode based on the first identifier.

In some embodiments, the second terminal device may further receive the SL bearer configuration from the first terminal device, and may establish, based on the SL bearer configuration, the SL bearer used to receive the data, to improve data transmission efficiency.

In a possible implementation, when the third information includes information about a plurality of common services, the establishing a second SL bearer based on the second SL bearer configuration may include: establishing a plurality of second SL bearers based on the second SL bearer configuration; and the receiving the data of the at least one common service from the first terminal device through the second SL bearer in the multicast mode based on the first identifier may include: receiving data of one of the at least one common service from the first terminal device through one of the plurality of second SL bearers in the multicast mode based on the first identifier.

In some embodiments, because each of the plurality of SL bearers is used to receive the data of only one service, after receiving the data through one SL bearer, the second terminal device may be prevented from identifying data of different services in the received data, to improve receiving efficiency of the second terminal device and reduce power consumption of the second terminal device.

In a possible implementation, the at least one common service belongs to an MBS.

In some embodiments, the first terminal device may be aware of data of the MBS, and send the data of the MBS to the plurality of second terminal devices in the multicast mode, so that the data of the MBS may be transmitted between the network device and the second terminal device.

According to a sixth aspect, a communication apparatus is disclosed. The apparatus may be a network device, or may be a module (for example, a chip) in the network device. The apparatus may include: a receiving unit, configured to receive M pieces of first information from M second terminal devices of a first terminal device, where the M pieces of first information are in a one-to-one correspondence with the M second terminal devices, the first information corresponds to at least one service, the at least one service is a service that the second terminal device of the M second terminal devices is interested in, and M is an integer greater than 1; and a sending unit (e.g., sending circuit), configured to send at least one piece of group information to the first terminal device, where the group information includes second information and third information, the second information includes information about N second terminal devices in the M second terminal devices, the third information includes information about at least one common service, the common service is a common service in at least N services, and N is an integer greater than 1 and less than or equal to M.

In a possible implementation, the group information further includes an air interface bearer configuration and/or an air interface physical resource configuration, the air interface bearer configuration is used to establish an air interface bearer, the air interface bearer is used to receive data of the at least one common service, and the air interface physical resource configuration is used to receive the data of the at least one common service.

In a possible implementation, the group information further includes a multicast configuration, the multicast configuration includes a first SL bearer configuration, the first SL bearer configuration is used to establish a first SL bearer, and the first SL bearer is used to send the data of the at least one common service.

In a possible implementation, when the third information includes information about a plurality of common services, that the first SL bearer configuration is used to establish a first SL bearer includes: The first SL bearer configuration is used to establish a plurality of first SL bearers; and that the first SL bearer is used to send the data of the at least one common service includes: each of the plurality of first SL bearers is used to send data of one of the at least one common service.

In a possible implementation, the receiving unit is further configured to receive first indication information from the first terminal device, where the first indication information is used to indicate a correspondence between the group information and a first identifier, and the first identifier is a group identifier.

In a possible implementation, the sending unit is further configured to send, through the first terminal device, the first identifier and information about a service corresponding to the first identifier to each of the N second terminal devices.

In a possible implementation, the at least one common service belongs to an MBS.

According to a seventh aspect, a communication apparatus is disclosed. The apparatus may be a first terminal device, or may be a module (for example, a chip) in the first terminal device. The apparatus may include: a receiving unit (e.g., receiving circuit), configured to receive at least one piece of group information from a network device, where the group information includes second information and third information, the second information includes information about N second terminal devices, the third information includes information about at least one common service, the N second terminal devices are in a one-to-one correspondence with N pieces of first information, the first information corresponds to at least one service, the at least one service is a service that the second terminal device of the M second terminal devices is interested in, the common service is a common service in at least N service, and N is an integer greater than 1; an allocation unit (e.g., allocation circuit), configured to allocate a first identifier to each of the at least one piece of group information, where the first identifier is a group identifier; and a sending unit, configured to send the first identifier and information about a service corresponding to the first identifier to each of the N second terminal devices.

In a possible implementation, the group information further includes an air interface bearer configuration and/or an air interface physical resource configuration, and the apparatus further includes: an establishment unit (e.g., establishment circuit), configured to establish an air interface bearer based on the air interface bearer configuration, where the receiving unit is further configured to receive data of the at least one common service from the network device through the air interface bearer; and a determining unit (e.g., determining circuit), configured to determine a physical resource based on the air interface physical resource configuration, where the receiving unit is further configured to receive the data of the at least one common service from the network device through the physical resource.

In a possible implementation, the group information further includes a multicast configuration, the multicast configuration includes a first SL bearer configuration, and the establishment unit is further configured to establish a first SL bearer based on the first SL bearer configuration, where the first SL bearer is used to send the data of the at least one common service.

In a possible implementation, when the third information includes information about a plurality of common services, that the establishment unit establishes a first SL bearer based on the first SL bearer configuration includes: establishing a plurality of first SL bearers based on the first SL bearer configuration; and that the first SL bearer is used to send the data of the at least one common service includes: each of the plurality of first SL bearers is used to send data of one of the at least one common service.

In a possible implementation, the sending unit is further configured to send a second SL bearer configuration to each of the N second terminal devices, where the second SL bearer configuration is used to establish a second SL bearer, the second SL bearer is used to receive the data of the at least one common service, and the first SL bearer configuration includes the second SL bearer configuration.

In a possible implementation, the allocation unit is configured to: send second indication information to an upper layer through an AS, where the second indication information is used to request the upper layer to allocate a group identifier; and allocate the first identifier through the upper layer based on the second indication information.

In a possible implementation, the sending unit is further configured to send first indication information to the network device, where the first indication information is used to indicate a correspondence between the group information and the first identifier.

In a possible implementation, that the sending unit sends the first identifier and information about a service corresponding to the first identifier to each of the N second terminal devices includes: sending first indication information to the network device, where the first indication information is used to indicate a correspondence between the group information and the first identifier, and the first indication information is used by the network device to send, through the first terminal device, the first identifier and the information about the service corresponding to the first identifier to each of the N second terminal devices.

In a possible implementation, the at least one common service belongs to an MBS.

According to an eighth aspect, a communication apparatus is disclosed. The apparatus may be a first terminal device, or may be a module (for example, a chip) in the first terminal device. The apparatus may include: a receiving unit, configured to receive M pieces of first information of M second terminal devices, where the M pieces of first information are in a one-to-one correspondence with the M second terminal devices, the first information corresponds to at least one service, the at least one service is a service that the second terminal device of the M second terminal devices is interested in, and M is an integer greater than 1; and a sending unit, configured to send a first identifier and information about a service corresponding to the first identifier to each of N second terminal devices, where the M second terminal devices include the N second terminal devices, the first identifier is a group identifier of a corresponding group, the first identifier corresponds to third information, the third information includes information about at least one common service, the common service is a common service in at least N services, the information about the service corresponding to the first identifier is the information included in the third information, and N is an integer greater than 1 and less than or equal to M.

In a possible implementation, the receiving unit is configured to: receive the M pieces of first information from the M second terminal devices; or receive the M pieces of first information from the M second terminal devices of a network device, where the M pieces of first information are sent by the M second terminal devices to the network device through a same first terminal device.

In a possible implementation, the sending unit is further configured to send at least one piece of group information to a network device, where the group information includes the third information; and the receiving unit is further configured to receive a multicast configuration corresponding to each of the at least one piece of group information from the network device, where the multicast configuration includes a first SL bearer configuration; and the apparatus further includes: an establishment unit, configured to establish a first SL bearer based on the first SL bearer configuration, where the first SL bearer is used to send data of the at least one common service.

In a possible implementation, when the third information includes information about a plurality of common services, the establishment unit is configured to establish a plurality of first SL bearers based on the first SL bearer configuration; and that the first SL bearer is used to send data of the at least one common service includes: each of the plurality of first SL bearers is used to send data of one of the at least one common service.

In a possible implementation, the sending unit is further configured to send a second SL bearer configuration to each of the N second terminal devices, where the second SL bearer configuration is used to establish a second SL bearer, the second SL bearer is used to receive the data of the at least one common service, and the first SL bearer configuration includes the second SL bearer configuration.

In a possible implementation, the group information further includes the first identifier.

In a possible implementation, the apparatus further includes: a creation unit (e.g., creation circuit), configured to create at least one group.

In a possible implementation, the creation unit is configured to: determine the at least one group; and allocate the first identifier to each of the at least one group.

In a possible implementation, that the creation unit allocates the first identifier to each of the at least one group includes: sending second indication information to an upper layer through an AS, where the second indication information is used to request to allocate the group identifier; and allocating the first identifier through the upper layer based on the second indication information.

In a possible implementation, the at least one common service belongs to an MBS.

According to a ninth aspect, a communication apparatus is disclosed. The apparatus may be a network device, or may be a module (for example, a chip) in the network device. The apparatus may include: a receiving unit, configured to receive at least one piece of group information from a first terminal device, where the group information includes third information, the third information includes information about at least one common service, N second terminal devices are in a one-to-one correspondence with N pieces of first information, the first information corresponds to at least one service, the at least one service is a service that the second terminal device of the M second terminal devices is interested in, the common service is a common service in at least N services, and N is an integer greater than 1; and a sending unit, configured to send a multicast configuration corresponding to each of the at least one piece of group information to the first terminal device, where the multicast configuration includes a first SL bearer configuration, the first SL bearer configuration is used to establish a first SL bearer, and the first SL bearer is used to send data of the at least one common service.

In a possible implementation, when the third information includes information about a plurality of common services, that the first SL bearer configuration is used to establish a first SL bearer includes: The first SL bearer configuration is used to establish a plurality of first SL bearers; and that the first SL bearer is used to send data of the at least one common service includes: each of the plurality of first SL bearers is used to send data of one of the at least one common service.

In a possible implementation, the receiving unit is further configured to: before receiving the at least one piece of group information from the first terminal device, receive M pieces of first information sent by M second terminal devices through the first terminal device, where the M pieces of first information are in a one-to-one correspondence with the M second terminal devices, the M second terminal devices include the N second terminal devices, and M is an integer greater than or equal to N; and the sending unit is further configured to send the M pieces of first information to the first terminal device.

In a possible implementation, the group information further includes a first identifier, the first identifier is used to identify a group corresponding to the group information, and the first identifier is a group identifier.

In a possible implementation, the at least one common service belongs to an MBS.

According to a tenth aspect, a communication apparatus is disclosed. The apparatus may be a second terminal device, or may be a module (for example, a chip) in the second terminal device. The apparatus may include: a sending unit, configured to send first information, where the first information corresponds to at least one service, and the at least one service is a service that the second terminal device of the M second terminal devices is interested in; and a receiving unit, configured to receive data of at least one common service from a first terminal device in a multicast mode based on a first identifier, where the first identifier corresponds to third information, the third information includes information about the at least one common service, N second terminal devices are in a one-to-one correspondence with N pieces of first information, the common service is a common service in at least N services, the N second terminal devices include the second terminal device, and the first identifier is a group identifier of a corresponding group.

In a possible implementation, the receiving unit is further configured to receive the first identifier and information about a service corresponding to the first identifier.

In a possible implementation, the sending unit is configured to: send the first information to a network device through the first terminal device; or send the first information to the first terminal device.

In a possible implementation, that the receiving unit receives the first identifier and information about a service corresponding to the first identifier includes: receiving, from the first terminal device in a unicast mode, the first identifier and the information about the service corresponding to the first identifier; or receiving, from the network device through the first terminal device, the first identifier and the information about the service corresponding to the first identifier.

In a possible implementation, the receiving unit is further configured to receive a second SL bearer configuration from the first terminal device; and the apparatus further includes: an establishment unit, configured to establish a second SL bearer based on the second SL bearer configuration; and that the receiving unit receives data of at least one common service from a first terminal device in a multicast mode based on a first identifier includes: receiving the data of the at least one common service from the first terminal device through the second SL bearer in the multicast mode based on the first identifier.

In a possible implementation, when the third information includes information about a plurality of common services, the establishment unit is configured to establish a plurality of second SL bearers based on the second SL bearer configuration; and that the receiving unit receives the data of the at least one common service from the first terminal device through the second SL bearer in the multicast mode based on the first identifier includes: receiving data of one of the at least one common service from the first terminal device through one of the plurality of second SL bearers in the multicast mode based on the first identifier.

In a possible implementation, the at least one common service belongs to an MBS.

According to an eleventh aspect, a communication apparatus is disclosed. The communication apparatus may be a network device or a module (for example, a chip) in the network device. The communication apparatus may include a processor, a memory, an input interface, and an output interface. The input interface is configured to receive information from a communication apparatus other than the communication apparatus, and the output interface is configured to output information to a communication apparatus other than the communication apparatus. When the processor executes a computer program stored in the memory, the processor is enabled to perform the communication method disclosed according to any one of the first aspect or the implementations of the first aspect.

According to a twelfth aspect, a communication apparatus is disclosed. The communication apparatus may be a first terminal device or a module (for example, a chip) in the first terminal device. The communication apparatus may include a processor, a memory, an input interface, and an output interface. The input interface is configured to receive information from a communication apparatus other than the communication apparatus, and the output interface is configured to output information to a communication apparatus other than the communication apparatus. When the processor executes a computer program stored in the memory, the processor is enabled to perform the communication method disclosed according to any one of the second aspect or the implementations of the second aspect.

According to a thirteenth aspect, a communication apparatus is disclosed. The communication apparatus may be a first terminal device or a module (for example, a chip) in the first terminal device. The communication apparatus may include a processor, a memory, an input interface, and an output interface. The input interface is configured to receive information from a communication apparatus other than the communication apparatus, and the output interface is configured to output information to a communication apparatus other than the communication apparatus. When the processor executes a computer program stored in the memory, the processor is enabled to perform the communication method disclosed according to any one of the third aspect or the implementations of the third aspect.

According to a fourteenth aspect, a communication apparatus is disclosed. The communication apparatus may be a network device or a module (for example, a chip) in the network device. The communication apparatus may include a processor, a memory, an input interface, and an output interface. The input interface is configured to receive information from a communication apparatus other than the communication apparatus, and the output interface is configured to output information to a communication apparatus other than the communication apparatus. When the processor executes a computer program stored in the memory, the processor is enabled to perform the communication method disclosed according to any one of the fourth aspect or the implementations of the fourth aspect.

According to a fifteenth aspect, a communication apparatus is disclosed. The communication apparatus may be a first terminal device or a module (for example, a chip) in the first terminal device. The communication apparatus may include a processor, a memory, an input interface, and an output interface. The input interface is configured to receive information from a communication apparatus other than the communication apparatus, and the output interface is configured to output information to a communication apparatus other than the communication apparatus. When the processor executes a computer program stored in the memory, the processor is enabled to perform the communication method disclosed according to any one of the fifth aspect or the implementations of the fifth aspect.

According to a sixteenth aspect, a communication system is disclosed. The communication system includes the communication apparatus according to the eleventh aspect, the communication apparatus according to the twelfth aspect, and the communication apparatus according to the fifteenth aspect.

According to a seventeenth aspect, a communication system is disclosed. The communication system includes the communication apparatus according to the thirteenth aspect, the communication apparatus according to the fourteenth aspect, and the communication apparatus according to the fifteenth aspect.

According to an eighteenth aspect, a computer-readable storage medium is disclosed. The computer-readable storage medium stores a computer program or computer instructions; and when the computer program or the computer instructions are run, the communication methods disclosed according to the foregoing aspects are implemented.

According to a nineteenth aspect, a chip is disclosed. The chip includes a processor, configured to execute a program stored in a memory. When the program is executed, the chip is enabled to perform the foregoing methods.

In a possible implementation, the memory is located outside the chip.

DESCRIPTION OF EMBODIMENTS

Embodiments of the present disclosure disclose a communication method, a communication apparatus, and a computer-readable storage medium, to save transmission resources and improve transmission efficiency. Details are separately described below.

Figures 1, 2:
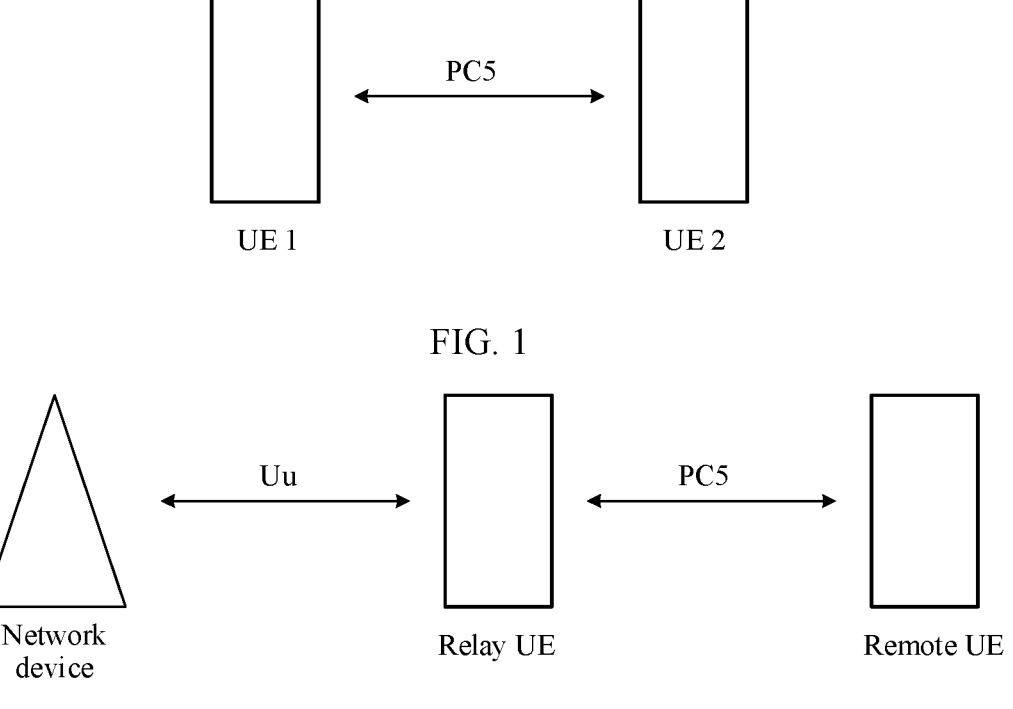
FIG. 1 is a schematic diagram of direct communication between user equipment (UEs) according to an embodiment of the present disclosure.
FIG. 2 is a schematic diagram of an architecture of a UE-to-network relay according to an embodiment of the present disclosure.

For better understanding embodiments of the present disclosure, the following first describes an application scenario of embodiments of the present disclosure. In a wireless communication system, communication may be performed between user equipment (UEs) through a network device, or communication may be directly performed between UEs not through a network device. FIG. 1 is a schematic diagram of direct communication between UEs according to an embodiment of the present disclosure. As shown in FIG. 1, communication may be performed between UEs through a PC5 interface. The PC5 interface is similar to a Uu interface between UE and a network device. A communication link between UEs may be referred to as an SL. A typical application scenario of SL communication is vehicle-to-everything (V2X). In the vehicle-to-everything, each vehicle is one UE, and data transmission may be directly performed between UEs through an SL but not through a network device. In this way, a communication delay can be reduced.

Broadcast communication, multicast communication, and unicast communication are supported on the SL. The broadcast communication on the SL is similar to broadcasting system information by the network device, and there is no limitation imposed on receiving UE. That is, for data of a service sent by transmitting UE, any UE interested in the service may receive the data. To be specific, the network device does not encrypt the data of the broadcast service, and any other UE within an effective reception scope may receive the data of the broadcast service if the UE is interested in the broadcast service. The multicast communication is communication limited within a group. One terminal device in the group sends data, another terminal device in the group receives the data, and any UE in the group may receive and/or send the data. The unicast communication is limited to communication between a pair of UEs. That is, one UE sends data and the other UE receives the data. The unicast communication is similar to data communication performed after a radio resource control (RRC) connection is established between the UE and the network device, and a unicast connection needs to be first established between two UEs. After the unicast connection is established, the two UEs may perform data communication based on a negotiated identifier, where data may or may not be encrypted.

FIG. 2 is a schematic diagram of an architecture of a UE-to-network relay according to an embodiment of the present disclosure. As shown in FIG. 2, a UE-to-network relay system may include a network device, relay UE, and remote UE. The network device communicates with the relay UE through a Uu interface, and the relay UE communicates with the remote UE through a PC5 interface. The relay UE is UE within coverage of the network device, and the remote UE may be UE outside the coverage of the network device, or may be UE within the coverage of the network device. Because the remote UE is located outside the coverage of the network device, or because of interference, noise, or the like, the remote UE cannot directly communicate with the network device, and relay needs to be performed through the relay UE. In a downlink, the network device may send data to the relay UE, and the relay UE forwards the data to the remote UE. In an uplink, the remote UE may send data to the relay UE, and the relay UE forwards the data to the network device. The remote UE establishes a unicast connection to the relay UE, and information between the remote UE and the network device is transmitted based on the unicast connection. It can be learned that in the UE-to-network relay system, the network device may communicate with the remote UE through the relay UE. Therefore, the coverage of the network device can be increased.

Figure 3:
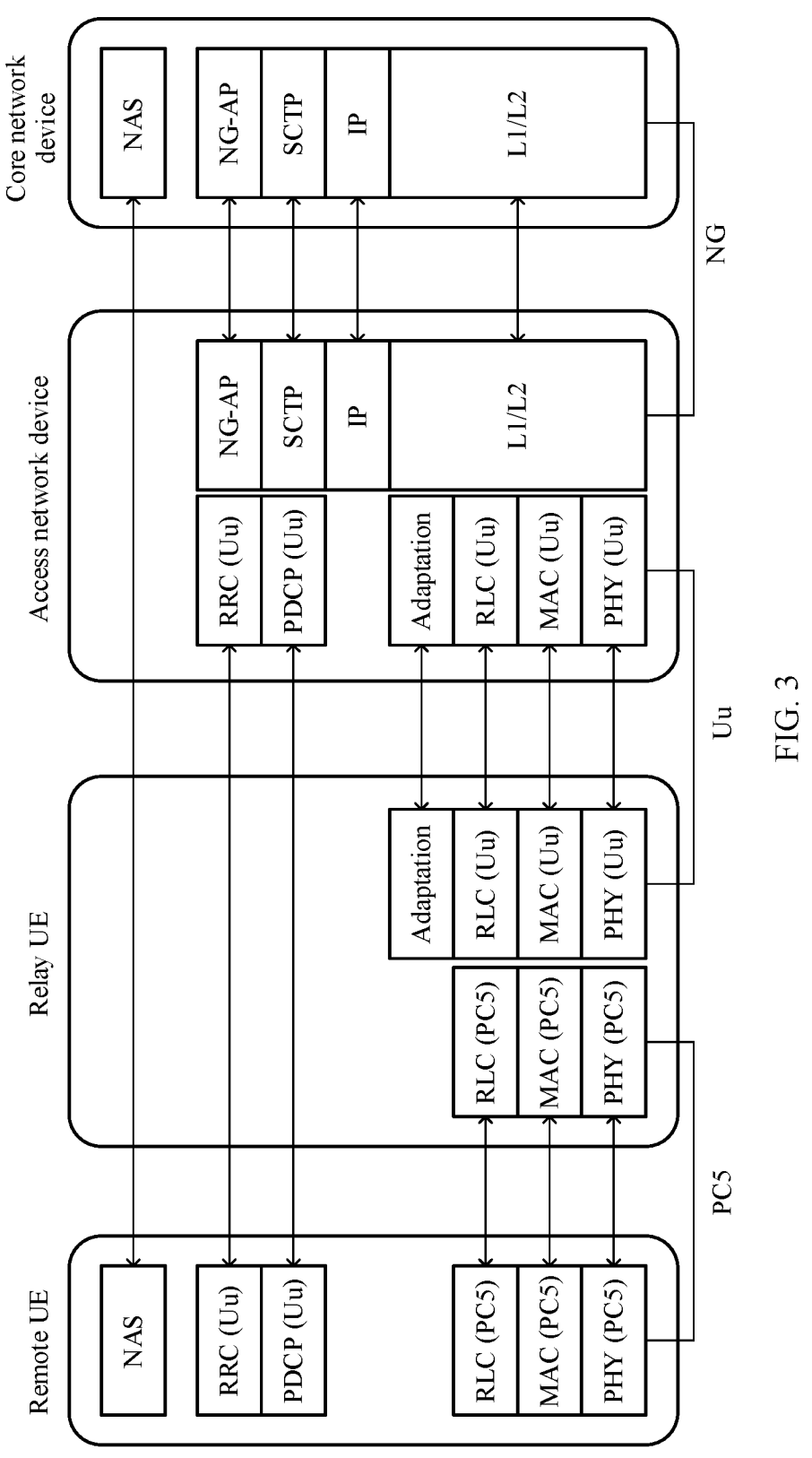
FIG. 3 is a schematic diagram of a control plane protocol stack of an L2 relay according to an embodiment of the present disclosure.
Figure 4:
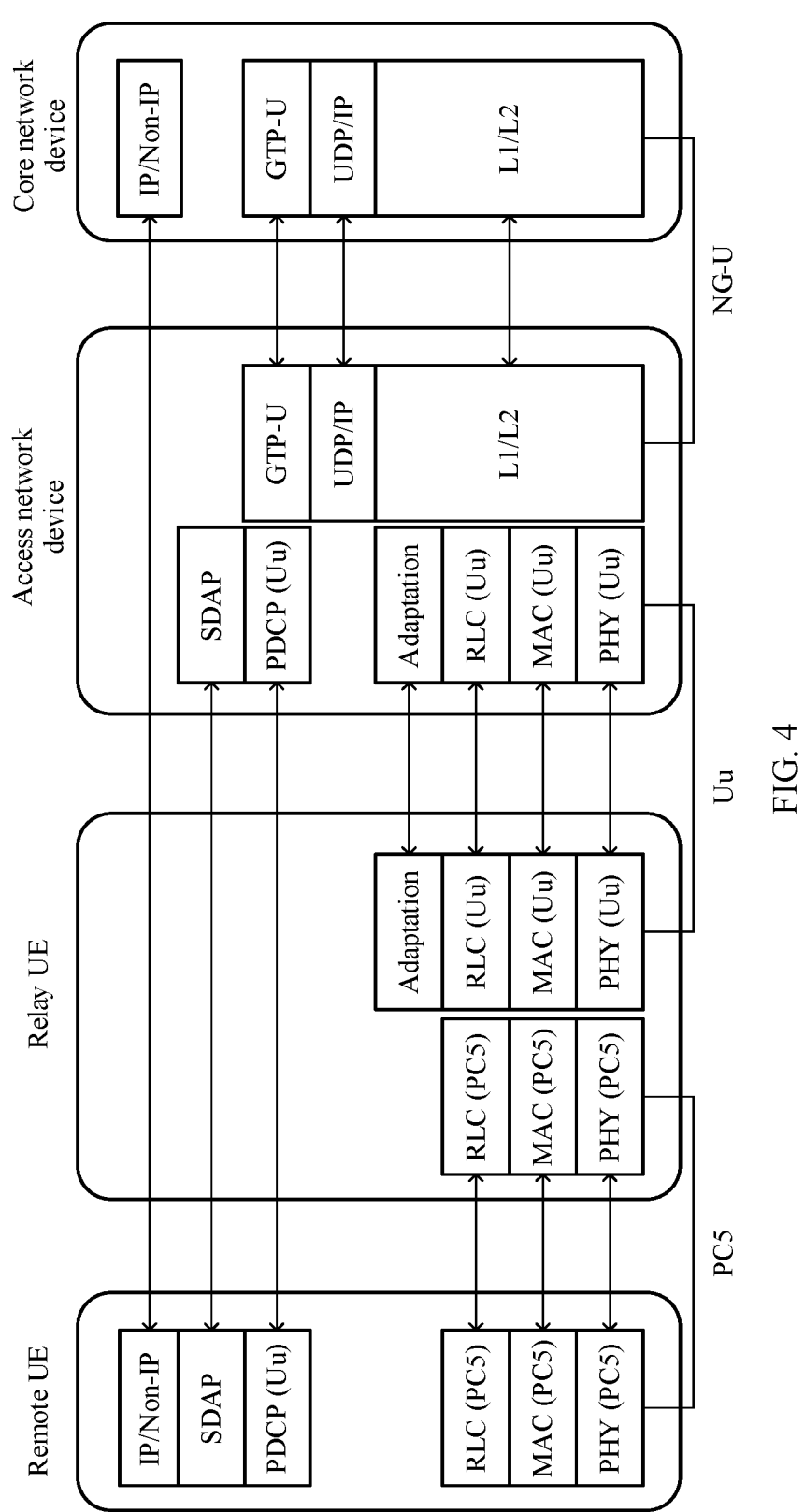
FIG. 4 is a schematic diagram of a user plane protocol stack of an L2 relay according to an embodiment of the present disclosure.

The UE-to-network relay may be classified into an L2 relay and an L3 relay based on a user plane protocol stack. FIG. 3 is a schematic diagram of a control plane protocol stack of an L2 relay according to an embodiment of the present disclosure. As shown in FIG. 3, remote UE may include a non-access stratum (NAS), an RRC layer, a packet data convergence protocol (PDCP) layer, a radio link control (RLC) layer, a media access control (MAC) layer, and a physical (PHY) layer. Relay UE may include an adaptation layer, an RLC layer, a MAC layer, and a PHY layer. An access network device may include an RRC layer, a PDCP layer, an adaptation layer, an RLC layer, a MAC layer, a PHY layer, a next generation (NG) application protocol (NG-AP) layer, a stream control transmission protocol (SCTP) layer, an internet protocol (IP) layer, and an L1/L2 layer. A core network device may include a NAS layer, an NG-AP layer, an SCTP layer, an IP layer, and an L1/L2 layer. As shown in FIG. 3, the remote UE communicates with the relay UE through a PC5 interface, the relay UE communicates with the access network device through a Uu interface, and the access network device communicates with the core network device through an NG interface. FIG. 4 is a schematic diagram of a user plane protocol stack of an L2 relay according to an embodiment of the present disclosure. As shown in FIG. 4, remote UE may include an IP/non-IP, a service data adaptation protocol (SDAP) layer, a PDCP layer, an RLC layer, a MAC layer, and a PHY layer. Relay UE may include an SDAP layer, an adaptation layer, an RLC layer, a MAC layer, and a PHY layer. An access network device may include an SADP layer, a PDCP layer, an adaptation layer, an RLC layer, a MAC layer, a PHY layer, a general packet radio service (GPRS) tunneling protocol (GTP-U) layer, a user datagram protocol (UDP)/IP layer, and an L1/L2 layer. A core network device may include an IP/non-IP, a GTP-U layer, a UDP/IP layer, and an L1/L2 layer. The non-IP may be an Ethernet. As shown in FIG. 4, the remote UE communicates with the relay UE through a PC5 interface, the relay UE communicates with the access network device through a Uu interface, and the access network device communicates with the core network device through an NG-U interface. It can be learned from FIG. 3 and FIG. 4 that user data is relayed at a PDCP layer.

Figure 5:
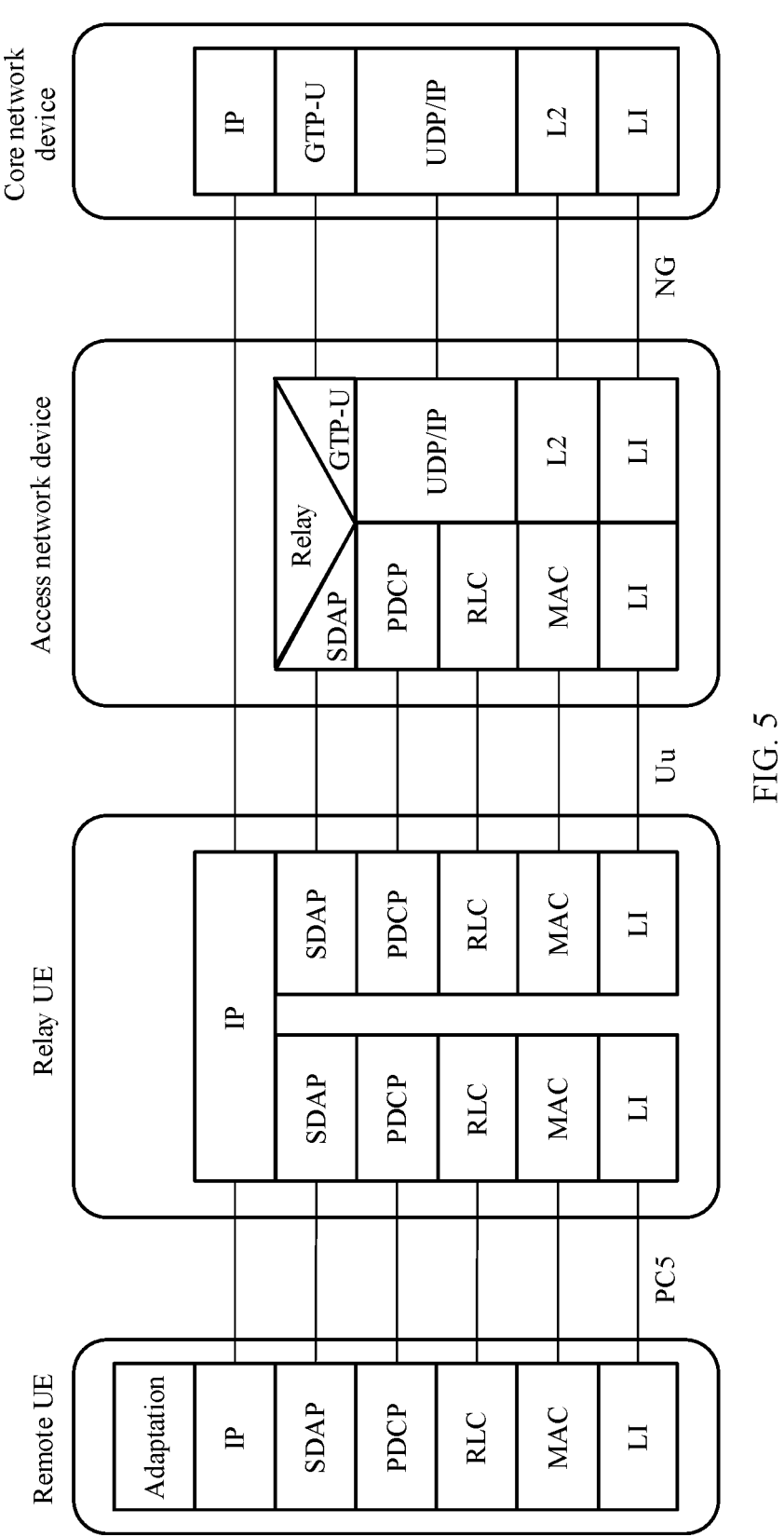
FIG. 5 is a schematic diagram of a user plane protocol stack of an L3 relay according to an embodiment of the present disclosure.

FIG. 5 is a schematic diagram of a user plane protocol stack of an L3 relay according to an embodiment of the present disclosure. As shown in FIG. 5, remote UE may include an adaptation layer, an IP layer, an SDAP layer, a PDCP layer, an RLC layer, a MAC layer, and an L1 layer. Relay UE may include an IP layer, an SDAP layer, a PDCP layer, an RLC layer, a MAC layer, and an L1 layer. An access network device may include an SDAP layer, a PDCP layer, an RLC layer, a MAC layer, an L1 layer, a GTP-U layer, a UDP/IP layer, and an L2 layer. A core network device may include an IP layer, a GTP-U layer, a UDP/IP layer, an L2 layer, and an L1 layer. As shown in FIG. 5, the remote UE communicates with the relay UE through a PC5 interface, the relay UE communicates with the access network device through a Uu interface, and the access network device communicates with the core network device through an NG interface. As shown in FIG. 5, there is no peer protocol layer between the remote UE and the access network device. The core network device may send data to the relay UE, and an IP layer of the relay UE processes the data and sends processed data to the remote UE.

FIG. 3, FIG. 4, and FIG. 5 are applied to a new radio (NR) system. It should be noted that, embodiments of the present disclosure are not limited to the user plane protocol stack and the control plane protocol stack in FIG. 3 to FIG. 5. The user plane protocol stack and the control plane protocol stack shown in FIG. 3 to FIG. 5 are merely examples, and are not limited in the present disclosure.

In the UE-to-network relay system, information between the network device and the remote UE is transmitted in a unicast mode, and the relay UE, used as an intermediate node between the network device and the remote UE, is not aware of content of the information transmitted between the remote UE and the network device, and is only used to forward the information. When the network device needs to transmit data of an MBS to the remote UE, the remote UE cannot directly receive the data of the MBS broadcast or multicast by the network device. In addition, the network device sends the data of the MBS in a broadcast mode or a multicast mode. Because no unicast connection is established between the network device and the remote UE for the MBS, the relay UE cannot forward the data of the MBS to the remote UE. Consequently, the data of the MBS cannot be transmitted between the network device and the remote UE. Therefore, how to transmit the data of the MBS between the network device and the remote UE has become an urgent technical problem to be resolved.

Figure 6:
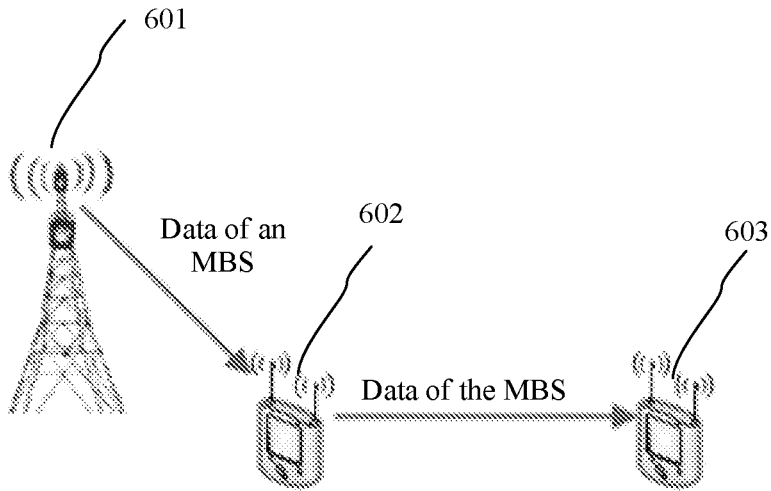
FIG. 6 is a schematic diagram of a network architecture according to an embodiment of the present disclosure.

To better understand the communication method, the apparatus, and the computer-readable storage medium disclosed in embodiments of the present disclosure, the following first describes a network architecture used in embodiments of the present disclosure. FIG. 6 is a schematic diagram of a network architecture according to an embodiment of the present disclosure. As shown in FIG. 6, the network device may include a network device 601, a relay terminal device 602, and a plurality of remote terminal devices 603 (where only one is shown in FIG. 6). When the plurality of remote terminal devices 603 are interested in data of an MBS, the network device 601 may send the data of the MBS to the relay terminal device 602, and the relay terminal device 602 may send the data of the MBS to the plurality of remote terminal devices 603. That is, the plurality of remote terminal devices 603 may receive, through the relay terminal device 602, the data, of the MBS, that the network device 601 is interested in.

The terminal device may also be referred to as UE, a mobile station (MS), a mobile terminal (MT), or the like, and is a device that provides voice and/or data connectivity for a user. The terminal device may be a handheld terminal, a notebook computer, a subscriber unit, a cellular phone, a smart phone, a wireless data card, a personal digital assistant (PDA) computer, a tablet computer, a wireless modem, a handheld device, a laptop computer, a cordless phone or a wireless local loop (WLL), a machine type communication (MTC) terminal, a wearable device (for example, a smartwatch, a smart band, or a pedometer), a vehicle-mounted device (for example, an automobile, a bicycle, an electric vehicle, an aircraft, a ship, a train, or a high-speed train), a virtual reality (VR) device, an augmented reality (AR) device, a wireless terminal in industrial control, a smart home device (for example, a refrigerator, a television, an air conditioner, or an electricity meter), an intelligent robot, a workshop device, a wireless terminal in self-driving, a wireless terminal in remote medical surgery, a wireless terminal in a smart grid, a wireless terminal in transportation safety, a wireless terminal in a smart city, a wireless terminal in a smart home, a flight device (for example, an intelligent robot, a hot balloon, an uncrewed aerial vehicle, or an aircraft), or another device that may access a network.

The network device is a device that provides radio access for the terminal device, and is mainly responsible for functions such as radio resource management, quality of service (QOS) flow management, and data compression and encryption on an air interface side. The network device may include base stations in various forms, such as a macro base station, a micro base station (also referred to as a small cell), a relay station, and an access point. The network device may further include a wireless fidelity (Wi-Fi) access point (AP). The network device may further include a worldwide interoperability for microwave access (WiMax) base station (BS).

Figure 7:
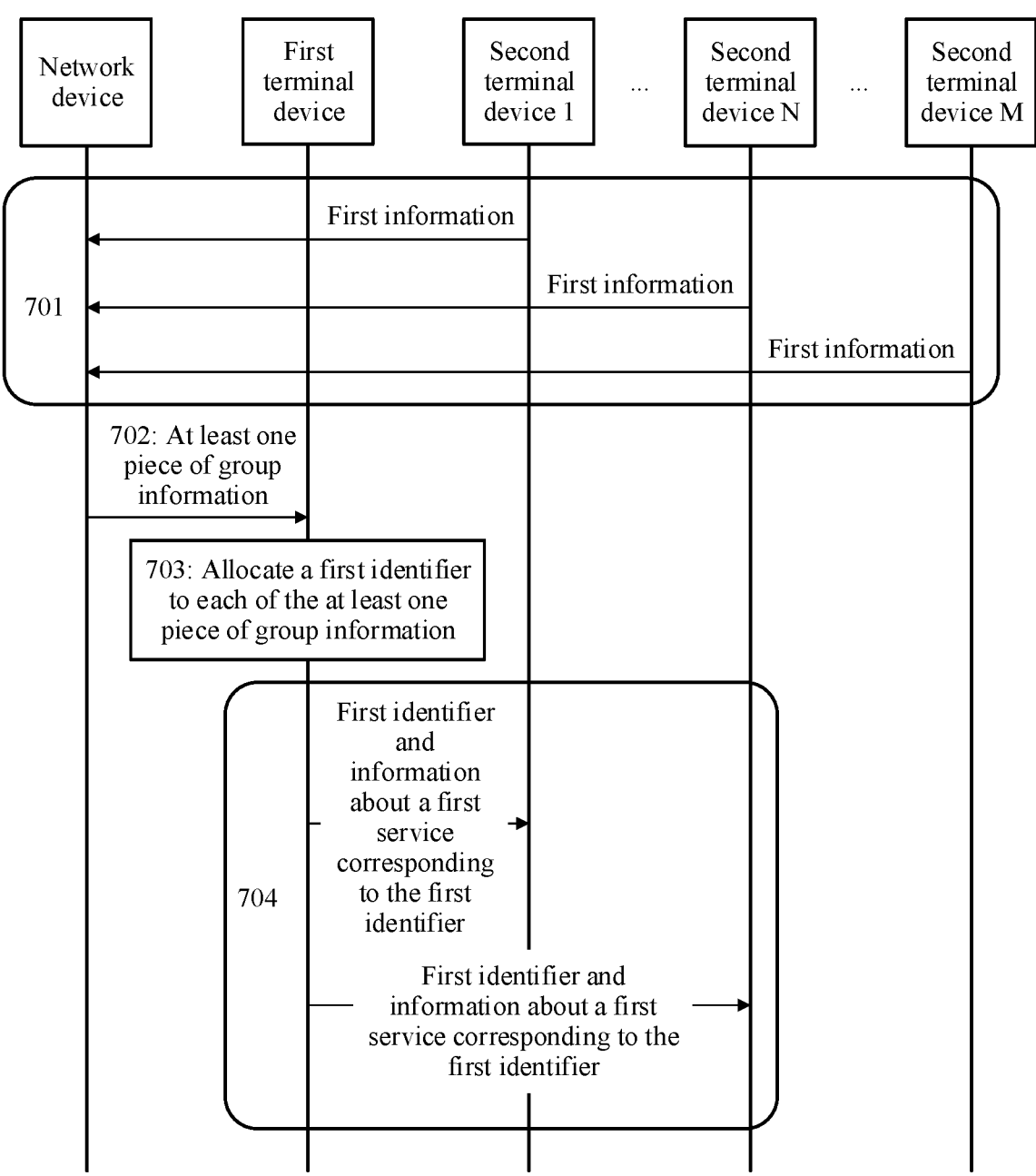
FIG. 7 is a schematic flowchart of a communication method according to an embodiment of the present disclosure.

Based on the foregoing network architecture, FIG. 7 is a schematic flowchart of a communication method according to an embodiment of the present disclosure. A function performed by a terminal device in the present disclosure may alternatively be performed by a module (for example, a chip) in the terminal device, and a function performed by a network device in the present disclosure may alternatively be performed by a module (for example, a chip) in the network device. As shown in FIG. 7, the communication method may include the following steps.

701: M second terminal devices separately send first information to a network device through a first terminal device.

When the second terminal device needs a service or some services, the second terminal device may send the first information to the network device through the first terminal device. To be specific, the second terminal device may send the first information to the first terminal device, and the first terminal device may forward the received first information to the network device. That the first information corresponds to at least one service may be understood as that the first information is associated with the at least one service, or may be understood as that the at least one service may be determined based on the first information. The first information may include information about the at least one service, or may include information about a service set, and the service set includes the at least one service. The at least one service is a service that the corresponding second terminal device is interested in, namely, a service required by the second terminal device. That is, the first information is information about the service that the second terminal device is interested in. The service that the second terminal device is interested in may be understood as the service required by the second terminal device, or may be understood as a service to be processed by the second terminal device, or may be understood as a service that is required by a user used by the second terminal device. A unicast connection is established between the first terminal device and the second terminal device, and the second terminal device may send the first information to the first terminal device through the unicast connection. A unicast connection is established between the first terminal device and the network device, and the first terminal device may send the information to the network device through the unicast connection. The first terminal device is the foregoing relay terminal device, and the second terminal device is the foregoing remote terminal device. The term "at least one" in the present disclosure may be one, or may be two or more.

Correspondingly, the network device receives M pieces of first information from the M second terminal devices of the first terminal device. The M pieces of first information of the M second terminal devices may be received by the network device at a time, or may be received by the network device for a plurality of times. That the M pieces of first information are in a one-to-one correspondence with the M second terminal devices may be understood as that each of the M second terminal devices sends one piece of first information to the network device. M is an integer greater than 1.

The information about the service may be a service name, or may be a temporary mobile group identity (TMGI) of the service, or may be other information that may be used to uniquely identify the service.

It should be understood that the foregoing first terminal device is a same first terminal device. That is, the M pieces of first information are forwarded through a same first terminal device.

702: The network device sends at least one piece of group information to the first terminal device.

Correspondingly, the first terminal device receives the at least one piece of group information from the network device.

Each of the at least one piece of group information may include second information and third information. The second information may include information about N second terminal devices in the M second terminal devices, where N is an integer greater than 1 and less than or equal to M. That is, the second information may include information about two or more second terminal devices in the M second terminal devices. The third information may include information about at least one common service. The common service may be a common first service in at least N first services, or may be understood as a service that all the N second terminal devices are interested in. The at least N first services are in a one-to-one correspondence with the N second terminal devices. The third information may include information about one service, or may include information about a plurality of services, namely, information about two or more services. The information about the service included in the third information herein may be the same as or different from the information about the service in step 701. The information about the service herein may include indication information of the service, for example, the TMGI or other service identifier information, and may further include an identifier used when UE receives service data, for example, a group radio network temporary identifier (G-RNTI). When the service included in the third information is an MBS, the information about the service included in the third information may also include an MBS session identifier. The information about the second terminal device may be an identifier allocated by the second terminal device, for example, an L2 identifier allocated by the second terminal device to an SL unicast connection between the second terminal device and the first terminal device; or may be an identifier allocated by the first terminal device to the second terminal device, for example, a local identifier or index, and may uniquely identify one second terminal device within a scope of the first terminal device; or may be an identifier allocated by a base station to the second terminal device, for example, a cell radio network temporary identifier (C-RNTI).

After receiving the M pieces of first information from the M second terminal devices of the first terminal device, the network device may first determine at least one group, and each of the at least one group corresponds to one piece of group information. The network device may determine, based on information about a first service included in each of the M pieces of first information, which pieces of first information in the M pieces of first information include information about a common service, that is, determine which pieces of first information in the M pieces of first information need the common service. In other words, the network device determines which second terminal devices are interested in the common service, and then may determine the at least one group based on the second terminal devices interested in the common service. Each group may correspond to information about one service, or may correspond to information about two or more services.

For example, assuming that M is 4, a correspondence between four pieces of first information and four second terminal devices may be shown in Table 1:

TABLE 1

| Correspondence between the first information and the second terminal device | |
| --- | --- |
| First information | The first information corresponds to the second terminal device. |
| Information 1 | Terminal device 1 |
| Information 2 | Terminal device 2 |
| Information 3 | Terminal device 3 |
| Information 4 | Terminal device 4 |

The information about the first service included in each of the four pieces of first information may be shown in Table 2:

TABLE 2

| Information about the first service included in the first information | |
| --- | --- |
| First information | Information about the first service included in the first information |
| Information 1 | Service 1, service 2, and service 4 |
| Information 2 | Service 2, service 3, and service 4 |
| Information 3 | Service 1, service 5, and service 6 |
| Information 4 | Service 1, service 3, and service 5 |

The second terminal device interested in each first service may be determined according to Table 1 and Table 2. The second terminal device interested in each first service may be shown in Table 3:

TABLE 3

| Second terminal device interested in the first service | |
| --- | --- |
| Information about the first service | Information about the second terminal device interested in the first service |
| Service 1 | Terminal device 1, terminal device 3, and terminal device 4 |
| Service 2 | Terminal device 1 and terminal device 2 |
| Service 3 | Terminal device 2 and terminal device 4 |
| Service 4 | Terminal device 1 and terminal device 2 |
| Service 5 | Terminal device 3 and terminal device 4 |
| Service 6 | Terminal device 3 |

It can be learned from Table 3 that only the terminal device 3 is interested in the service 6, it indicates that no two or more second terminal devices are interested in the service 6, and the service 6 may be removed; or a group may be determined based on the service 6 and the terminal device 3. However, because only one second terminal device in the group is interested in the service 6, group information corresponding to the group may not be sent to the first terminal device in step 702. However, there are two or more second terminal devices interested in each of the service 1, the service 2, the service 3, the service 4, and the service 5 at the same time. Therefore, at least one group may be determined based on each first service in the service 1, the service 2, the service 3, the service 4, and the service 5 and the second terminal device interested in the first service. The group and corresponding group information that are determined based on each first service in the service 1, the service 2, the service 3, the service 4, and the service 5 and the second terminal device corresponding to the first service may be shown in Table 4 or Table 5:

TABLE 4

| Group and corresponding group information | | |
| --- | --- | --- |
| | | Group information. |
| Group | Third information | Second information |
| Group 1 | Service 1 | Terminal device 1, terminal device 3, and terminal device 4 |
| Group 2 | Service 2 | Terminal device 1 and terminal device 2 |
| Group 3 | Service 3 | Terminal device 2 and terminal device 4 |
| Group 4 | Service 4 | Terminal device 1 and terminal device 2 |
| Group 5 | Service 5 | Terminal device 3 and terminal device 4 |

TABLE 5

| Group and corresponding group information | | |
| --- | --- | --- |
| | | Group information. |
| Group | Third information | Second information |
| Group 1 | Service 1 | Terminal device 1, terminal device 3, and terminal device 4 |
| Group 2 | Service 2 and service 4 | Terminal device 1 and terminal device 2 |
| Group 3 | Service 3 | Terminal device 2 and terminal device 4 |
| Group 4 | Service 5 | Terminal device 3 and terminal device 4 |

As shown in Table 4, each group may correspond to one first service and second terminal devices interested in the first service. As shown in Table 5, because second terminal devices that are interested in the service 2 and the service 4 are both the terminal device 1 and the terminal device 2, one group may be determined based on the service 2 and the service 4 and the terminal device 1 and the terminal device 2 that are interested in the two services. In other words, when a plurality of second terminal devices that are interested in a plurality of first services are the same, one group may be determined based on the plurality of first services and the plurality of second terminal devices.

It should be noted that manners of determining a group by the network device corresponding to Table 1 to Table 5 are merely examples, and are not limited in the present disclosure. For example, the network device may store group information corresponding to each group. After subsequently receiving the first information from the second terminal device through the first terminal device, the network device may increase, based on the information about the at least one first service included in the first information, a quantity of second terminal devices included in the second information in the group information. Correspondingly, when the second terminal device is not interested in the first service that the second terminal device is previously interested in, a quantity of second terminal devices included in the second information in the group information may also be reduced. It should be understood that one group may correspond to one second terminal device, or may correspond to a plurality of second terminal devices. A quantity of second terminal devices corresponding to a group may increase with an increase of second terminal devices interested in the first service, or may decrease with a decrease of second terminal devices interested in the first service. Similarly, a quantity of groups may also change with a change of the service that the second terminal device is interested in.

It should be understood that first information sent by a plurality of second terminal devices corresponding to one group may be forwarded through a same first terminal device, so that it can be ensured that the plurality of second terminal devices are close to the first terminal device. In this way, when the first terminal device subsequently sends data of a service to the plurality of second terminal devices in a multicast mode, it can be ensured that all the plurality of second terminal devices can receive the data of the service.

After receiving the first information from the first terminal device, the network device may determine the group based on the first information. Alternatively, the network device may determine the group only when there is information about a common service in a plurality of pieces of received first information. The plurality of pieces of first information may be received at a time, or may be received within fixed time, or may be received within a time period less than or equal to a fixed time period. In addition, after receiving the first information from the second terminal device, the first terminal device may forward the first information to the network device. Alternatively, after receiving a specific quantity of pieces of first information, the first terminal device may forward these pieces of first information together to the network device. Alternatively, the first terminal device may forward these pieces of received first information together to the network device within a period of time. Alternatively, the first terminal device may forward these pieces of received first information together to the network device at fixed time.

After determining the at least one group, the network device may send the at least one piece of group information corresponding to the at least one group to the first terminal device. The network device may send the at least one piece of group information to the first terminal device through the unicast connection.

Optionally, after determining the at least one group, the network device may configure an air interface bearer configuration for a first service corresponding to each of the at least one group, or may configure an air interface physical resource configuration for a first service corresponding to each of the at least one group, or may configure an air interface bearer configuration and an air interface physical resource configuration for a first service corresponding to each of the at least one group. Correspondingly, each of the at least one piece of group information may include the air interface bearer configuration and/or the air interface physical resource configuration.

Optionally, after determining the at least one group, the network device may configure a multicast configuration for each of the at least one group, where the multicast information may include a first sidelink (SL) bearer configuration. Correspondingly, each of the at least one piece of group information may include the multicast configuration.

703: The first terminal device allocates a first identifier to each of the at least one piece of group information.

After receiving the at least one piece of group information from the network device, the first terminal device may allocate the first identifier to each of the at least one piece of group information, where the first identifier is a group identifier of a corresponding group, and is used for SL multicast communication.

An access stratum (AS) of the first terminal device may send second indication information to an upper layer, where the second indication information is used to request to allocate the group identifier. After receiving the second indication information, the upper layer of the first terminal device may allocate the first identifier based on the second indication information. Optionally, the second indication information may carry a quantity of groups, and the first terminal device may determine the quantity of groups based on a quantity of pieces of group information, so that the upper layer of the first terminal device may determine, based on the quantity, a quantity of group identifiers to be allocated. The second indication information may also carry the at least one piece of group information, so that the upper layer of the first terminal device may determine, based on the at least one piece of group information, the quantity of group identifiers to be allocated. The upper layer of the first terminal device may be understood as a protocol layer above the AS of the first terminal device, and may be a V2X layer, a PC5-S(e.g., a PC5 signaling protocol stack) layer, a NAS layer, or another protocol layer, above the AS, capable of allocating a group identifier.

Optionally, when the group information includes the air interface bearer configuration and/or the air interface physical resource configuration, the first terminal device may establish an air interface bearer based on the air interface bearer configuration, so that the first terminal device may subsequently receive data of the at least one common service from the network device through the air interface bearer. The first terminal device may determine a physical resource based on the air interface physical resource configuration, so that the first terminal device may subsequently receive the data of the at least one common service from the network device through the physical resource.

Optionally, when the group information includes the multicast configuration, the first terminal device may establish a first SL bearer based on the first SL bearer configuration, so that the first terminal device may subsequently send the data of the at least one common service to the corresponding second terminal device through the first SL bearer. The first terminal device may establish at least one first SL bearer based on the first SL bearer configuration. When the first SL bearer configuration corresponds to one first service, that is, the third information includes information about one first service, each of the at least one first SL bearer may be used to send different data of the first service. When the first SL bearer configuration corresponds to a plurality of first services, that is, the third information includes information about a plurality of first services, each of the at least one first SL bearer may be used to send data of one of the plurality of first services. In other words, one first SL bearer can send data of only one first service, and data of one first service may be sent through a plurality of first SL bearers.

704: The first terminal device sends the first identifier and information about a first service corresponding to the first identifier to each of the N second terminal devices.

After allocating the first identifier to each of the at least one piece of group information, the first terminal device may send the first identifier and the information about the first service corresponding to the first identifier to each of the N second terminal devices. In addition, the first terminal device may store the first identifier and the information about the first service corresponding to the first identifier, so that the first terminal device may subsequently send, in the multicast mode based on the first identifier, data of the first service corresponding to the first identifier to the N second terminal devices.

In some implementations, the first terminal device may directly send the first identifier and the information about the first service corresponding to the first identifier to the second terminal device. A unicast connection is established between the first terminal device and each second terminal device. Therefore, the first terminal device may send the group identifier and the information about the first service corresponding to the group identifier to each of the N second terminal devices in a unicast mode. In one case, the upper layer of the first terminal device may generate upper layer signaling, where the upper layer signaling may include the first identifier and the information about the first service corresponding to the first identifier; and the first terminal device may send the upper layer signaling to each of the N second terminal devices in the unicast mode. In another case, the upper layer of the first terminal device may send the allocated first identifier to the AS of the first terminal device; the AS of the first terminal device may generate an SL RRC message, where the SL RRC message includes the first identifier and the information about the first service corresponding to the first identifier; and the first terminal device may send the SL RRC message to each of the N second terminal devices in the unicast mode.

In other implementations, the first terminal device may send the first identifier and the information about the first service corresponding to the first identifier to each of the N second terminal devices through the network device. The first terminal device may send first indication information to the network device, where the first indication information is used to indicate a correspondence between the group information and the first identifier. After receiving the first indication information, the network device may first determine, based on the first indication information, the first identifier corresponding to each of the at least one piece of group information. In one case, the first indication information may be the first identifier corresponding to each of the at least one piece of group information. A sequence of the first identifier corresponding to each of the at least one piece of group information is determined based on a sequence of the at least one piece of group information received by the first terminal device. That is, it is ensured that a sequence of the sent first identifier is the same as a sequence of the corresponding received group information. For example, it is assumed that a quantity of pieces of group information is 4, and a sequence of the four pieces of received group information may be shown in Table 6:

TABLE 6

| Sequence of the group information Group information. | |
| --- | --- |
| Second information | Third information |
| Terminal device 1, terminal device 3, and terminal device 4 | Service 1 |
| Terminal device 1 and terminal device 2 | Service 2 and service 4 |
| Terminal device 2 and terminal device 4 | Service 3 |
| Terminal device 3 and terminal device 4 | Service 5 |

The first indication information may be shown in Table 7:

TABLE 7

| First indication information First identifier |
| --- |
| Identifier 1 |
| Identifier 2 |
| Identifier 4 |
| Identifier 3 |

It may be determined, according to Table 6 and Table 7, that the identifier 1 is the first identifier corresponding to the service 1, the identifier 2 is the first identifier corresponding to the service 2 and the service 4, the identifier 4 is the first identifier corresponding to the service 3, and the identifier 3 is the first identifier corresponding to the service 5. In another case, the first indication information may be the at least one piece of group information and the first identifier corresponding to the at least one piece of group information. For example, the first indication information may be shown in Table 8:

TABLE 8

| First indication information | | |
| --- | --- | --- |
| Group information. | | First |
| Second information | Third information | identifier |
| Terminal device 1, terminal device 3, and terminal device 4 | Service 1 | Identifier 1 |
| Terminal device 1 and terminal device 2 | Service 2 and service 4 | Identifier 2 |
| Terminal device 2 and terminal device 4 | Service 3 | Identifier 4 |
| Terminal device 3 and terminal device 4 | Service 5 | Identifier 3 |

In still another case, the first indication information may be at least one piece of second information and a first identifier corresponding to the at least one piece of second information. In still another case, the first indication information may be at least one piece of third information and a first identifier corresponding to the at least one piece of third information. For example, the first indication information may be shown in Table 9 or Table 10:

TABLE 9

| First indication information | |
| --- | --- |
| Second information | First identifier |
| Terminal device 1, terminal device 3, and terminal device 4 | Identifier 1 |
| Terminal device 1 and terminal device 2 | Identifier 2 |
| Terminal device 2 and terminal device 4 | Identifier 4 |
| Terminal device 3 and terminal device 4 | Identifier 3 |

TABLE 10

| First indication information | |
| --- | --- |
| Third information | First identifier |
| Service 1 | Identifier 1 |
| Service 2 and service 4 | Identifier 2 |
| Service 3 | Identifier 4 |
| Service 5 | Identifier 3 |

It should be understood that Table 6 to Table 10 are merely examples, and are not limited in the present disclosure.

After receiving the first indication information from the first terminal device, the network device may first determine, based on the sequence of the sent at least one piece of group information, the first identifier corresponding to each of the at least one piece of group information. Then, the network device may separately send, through the first terminal device, the corresponding first identifier and the information about the first service to the second terminal device corresponding to the information about the second terminal device included in each piece of group information. The network device may perform sending in a manner in which the network device sends signaling to remote UE in an existing UE-to-network architecture. For example, the information about the second terminal device and information that the network device needs to send to the second terminal device through the second terminal device may be first sent to the first terminal device. After receiving the information, the first terminal device sends, to the corresponding second terminal device based on the information about the second terminal device, the information that the network device needs to send to the second terminal device. The information about the second terminal device may be an identifier allocated by the first terminal device to the second terminal device, or may be other information that may be used to identify the second terminal device, and may be carried in a header of an adaptation layer.

Correspondingly, the second terminal device receives the first identifier and the information about the first service corresponding to the first identifier. Then, the second terminal device may receive the data of the at least one common service from the first terminal device in the multicast mode based on the first identifier.

Optionally, after allocating the first identifier to each of the at least one piece of group information, the first terminal device may send the first indication information to the network device, where the first indication information is used to indicate the correspondence between the group information and the first identifier, that is, report the first identifier corresponding to each of the at least one piece of group information to the network device. After receiving the first indication information, the network device may store the at least one piece of group information and the first identifier corresponding to each of the at least one piece of group information, for subsequent invocation. For example, when there is another second terminal device subsequently interested in the service included in the third information, the network device may update the group information and the corresponding first identifier that are sent to the first terminal device, so that the first terminal device may add a new second terminal device to an existing multicast group. When the first terminal device directly sends the first identifier and the information about the first service corresponding to the first identifier to the second terminal device, the first terminal device may report the first identifier to the network device. When the first terminal device sends the first identifier and the information about the first service corresponding to the first identifier to each of the N second terminal devices through the network device, the first terminal device does not need to report the first identifier to the network device.

Optionally, when the group information includes the multicast configuration, the first terminal device may send a second SL bearer configuration to each of the N second terminal devices, where the first SL bearer configuration may include the second SL bearer configuration. The first SL bearer configuration may include information related to sending, and information related to receiving and sending. The first terminal device needs to use the information related to sending and the information related to receiving and sending, and the second terminal device needs to use the information related to receiving and sending. Therefore, the first terminal device may send the information related to receiving and sending to the second terminal device. That is, the second SL bearer configuration includes the information related to receiving and sending. For example, the information related to receiving and sending may include a length of an RLC sequence number.

Correspondingly, after receiving the second SL bearer configuration from the first terminal device, the second terminal device may establish a second SL bearer based on the second SL bearer configuration, so that the second terminal device may receive the data of the at least one common service from the first terminal device through the second SL bearer. The second terminal device may establish at least one second SL bearer based on the second SL bearer configuration. When the second SL bearer configuration corresponds to one first service, that is, the third information includes information about one first service, each of the at least one second SL bearer may be used to receive different data of the first service. When the second SL bearer configuration corresponds to a plurality of first services, that is, the third information includes information about a plurality of first services, each of the at least one second SL bearer may be used to receive data of one of the plurality of first services. In other words, one second SL bearer can send data of only one first service, and data of one first service may be sent through a plurality of second SL bearers.

Optionally, after determining the at least one group, the network device may allocate a second identifier to each of the at least one group, and then send the second identifier and information about a first service corresponding to the second identifier to each of the first terminal device and the second terminal device. In this case, the group information sent in step 702 may further include the second identifier. It should be understood that, when the network device allocates the second identifier, the first terminal device does not perform step 703, and the first terminal device may store the group information, to subsequently transmit data of a corresponding service. Step 704 may be as follows: The first terminal device sends the second identifier and the information about the first service corresponding to the second identifier to each of the N second terminal devices. The second identifier is a group identifier of a corresponding group, and is used for SL multicast communication. For example, the second identifier may be an L2 identifier, and is used by the first terminal device to send, in the multicast mode through an SL, data of a service corresponding to the group to the second terminal device. The first identifier may be the same as or different from the second identifier.

Related content in step 701 to step 704 may be mutually referenced, and is not limited to the corresponding steps.

Figure 8A:
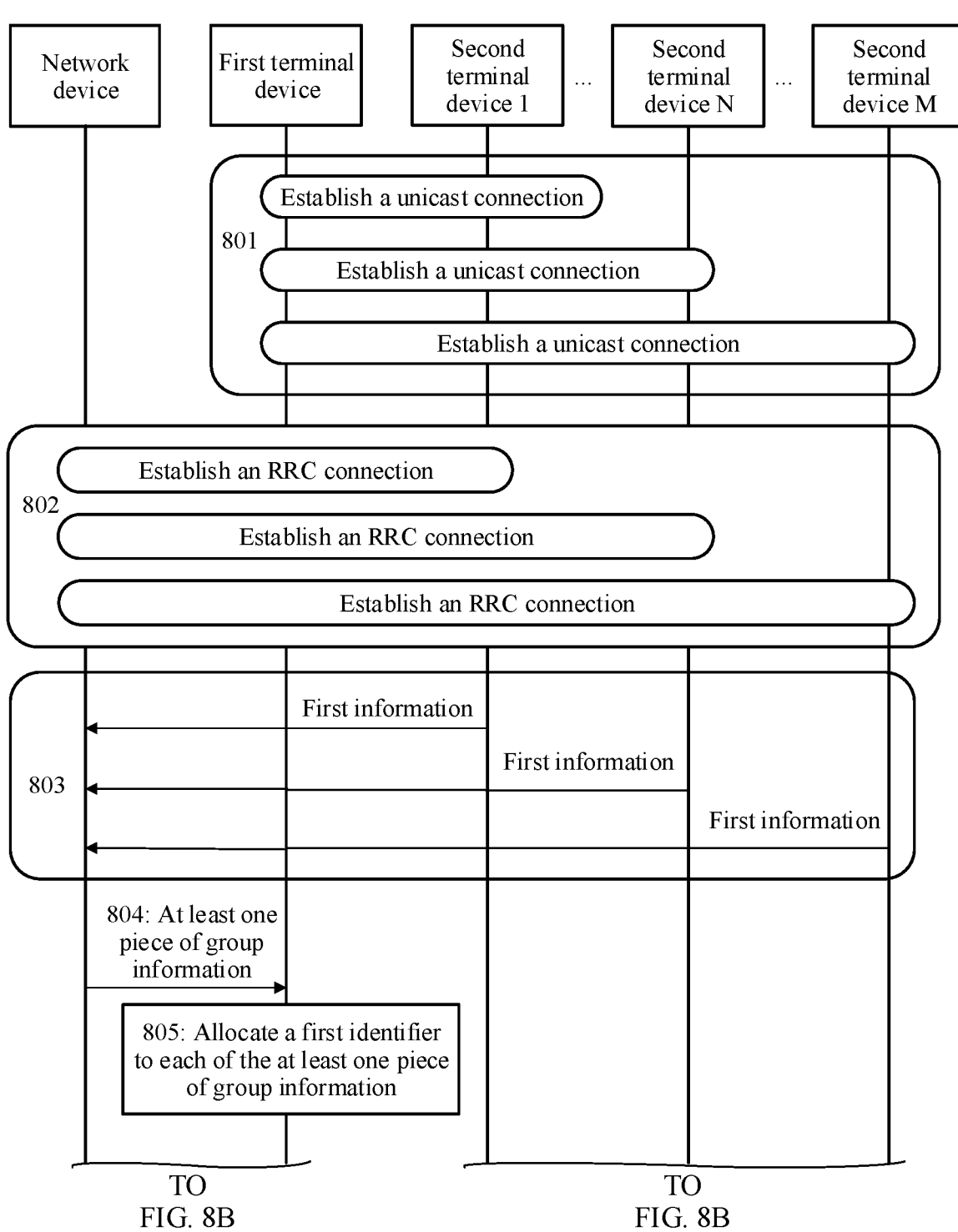
FIG. 8A and FIG. 8B are a schematic flowchart of another communication method according to an embodiment of the present disclosure.
Figure 8B:
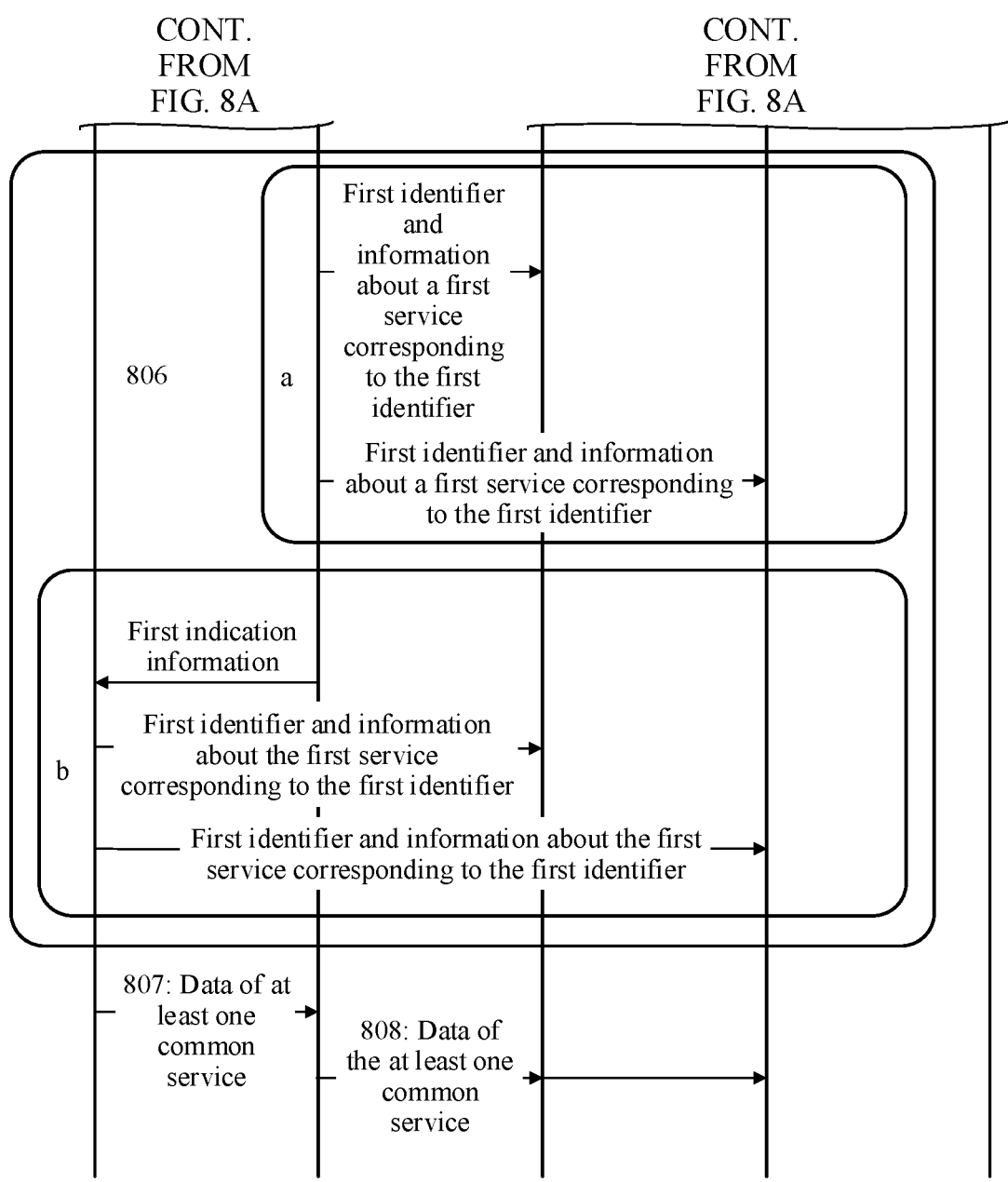

Based on the foregoing network architecture, FIG. 8A and FIG. 8B are a schematic flowchart of another communication method according to an embodiment of the present disclosure. As shown in FIG. 8, the communication method may include the following steps.

801: A second terminal device establishes a unicast connection to a first terminal device.

The second terminal device may select a first terminal device according to a selection rule of the first terminal device, and establish an SL unicast connection to the selected first terminal device. For example, the selection rule may be that reference signal received power (RSRP) or reference signal received quality (RSRQ) is the largest, or may be that a service that the second terminal device is interested in is a service supported by a cell in which the first terminal device is located, or may be that the second terminal device is the closest to the first terminal device.

802: The second terminal device establishes an RRC connection to a network device through the first terminal device.

After establishing the unicast connection to the first terminal device, the second terminal device may establish the RRC connection to the network device through the first terminal device.

803: M second terminal devices separately send first information to the network device through the first terminal device.

For detailed descriptions of step 803, refer to the descriptions of step 701. Details are not described herein again.

804: The network device sends at least one piece of group information to the first terminal device.

For detailed descriptions of step 804, refer to the descriptions of step 702. Details are not described herein again.

805: The first terminal device allocates a first identifier to each of the at least one piece of group information.

For detailed descriptions of step 805, refer to the descriptions of step 703. Details are not described herein again.

806: The first terminal device sends the first identifier and information about a first service corresponding to the first identifier to each of N second terminal devices.

Step 806 may include the following two implementations:

a: The first terminal device directly sends the first identifier and the information about the first service corresponding to the first identifier to each of the N second terminal devices.

b: The first terminal device sends first indication information to the network device, and the network device sends the first identifier and the information about the first service corresponding to the first identifier to each of the N second terminal devices through the first terminal device.

For detailed descriptions of step 806, refer to the descriptions of step 704. Details are not described herein again. For detailed descriptions of the implementation a, refer to an implementation in step 706. For detailed descriptions of the implementation b, refer to another implementation in step 704.

807: The network device sends data of at least one common service to the first terminal device.

After receiving the first identifier and the information about the first service corresponding to the first identifier, the second terminal device may send third indication information to the network device through the first terminal device. The third indication information is used to indicate that establishment of a multicast path is completed. After receiving the third indication information, the network device may send the data of the at least one common service to the first terminal device. After receiving the first identifier and the information about the first service corresponding to the first identifier, the second terminal device may not send information to the network device. In this case, the network device may send the data of the at least one common service to the first terminal device after specific time after sending the at least one piece of group information to the first terminal device. The data of the at least one common service may be sent by the network device in a unicast, multicast, or broadcast mode. The at least one common service may be an MBS, or may be another service. This is not limited herein.

808: The first terminal device sends the data of the at least one common service to the N second terminal devices in the multicast mode.

After the first terminal device receives the data from the network device, when the data is data corresponding to the first identifier, the first terminal device may send, in the multicast mode, the data to the N second terminal devices corresponding to the first identifier.

Figure 9:
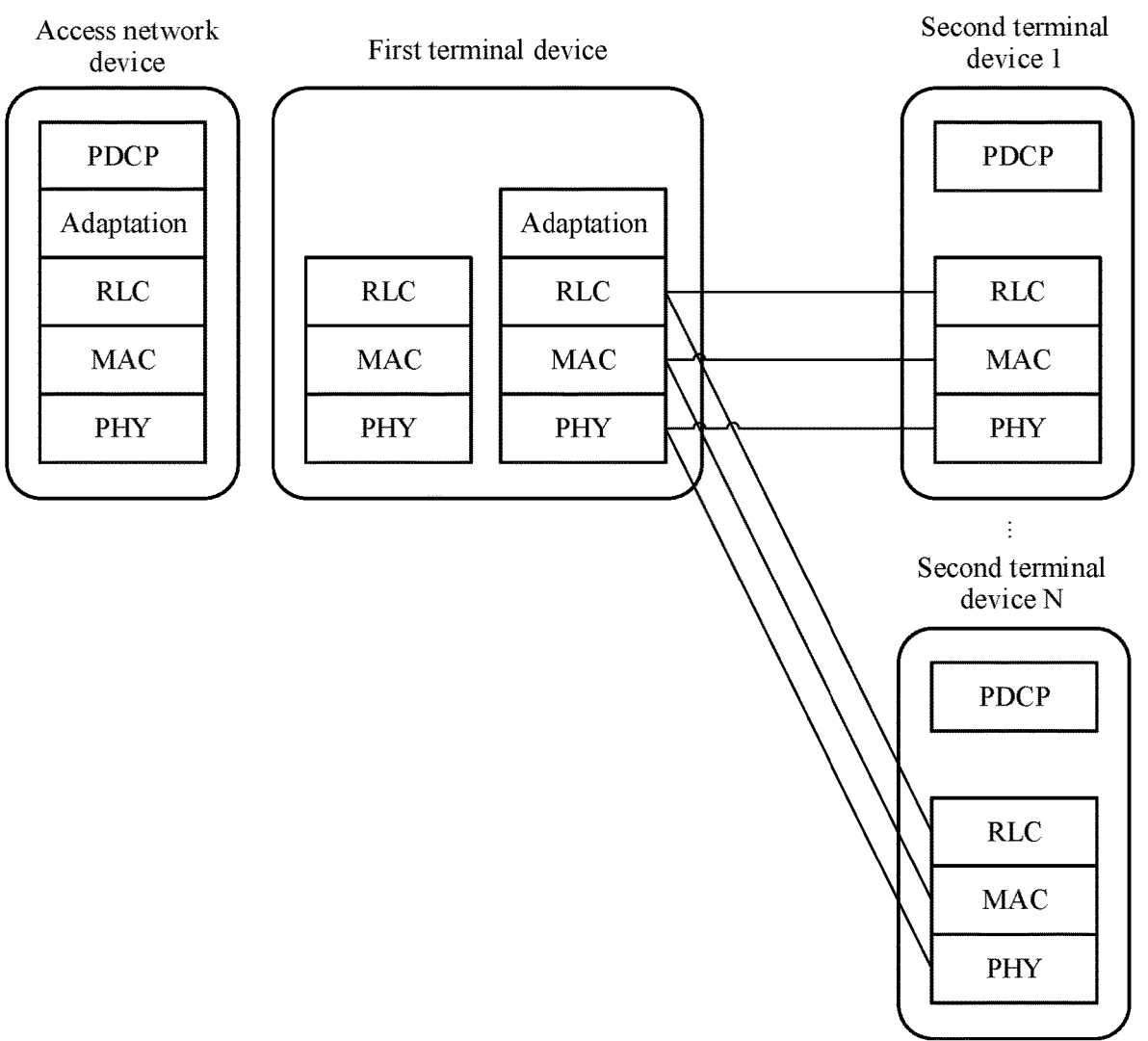
FIG. 9 is a schematic diagram of another user plane protocol stack of an L2 relay according to an embodiment of the present disclosure.

FIG. 9 is a schematic diagram of another user plane protocol stack of an L2 relay according to an embodiment of the present disclosure. As shown in FIG. 9, a first terminal device may send data of at least one common service by using one SL resource through one set of protocol stacks, to save resources and improve transmission efficiency.

Figure 10:
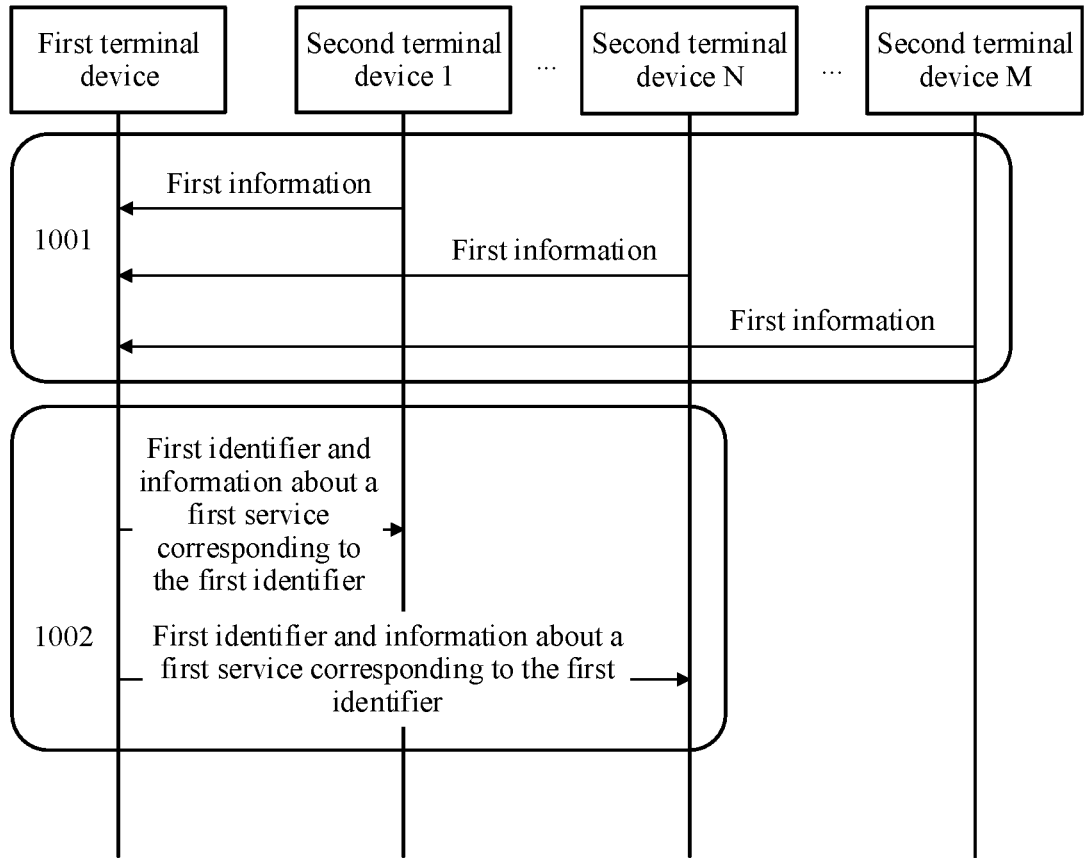
FIG. 10 is a schematic flowchart of still another communication method according to an embodiment of the present disclosure.

Based on the foregoing network architecture, FIG. 10 is a schematic flowchart of still another communication method according to an embodiment of the present disclosure. As shown in FIG. 10, the communication method may include the following steps.

1001: M second terminal devices separately send first information to a first terminal device.

When the second terminal device needs a service or some services, the second terminal device may send the first information to the first terminal device, that is, send information about a service of interest to the first terminal device. That the first information corresponds to at least one first service may be understood as that the first information is associated with the at least one first service, or may be understood as that the at least one first service may be determined based on the first information. The first information may include information about the at least one first service, or may include information about a service set, and the service set includes the at least one first service. The at least one first service is a service that the corresponding second terminal device is interested in, namely, a service required by the second terminal device. That is, the first information is information about the service that the second terminal device is interested in. The service that the second terminal device is interested in may be understood as the service required by the second terminal device, or may be understood as a service to be processed by the second terminal device, or may be understood as a service that is required by a user used by the second terminal device. A unicast connection is established between the first terminal device and the second terminal device, and the second terminal device may send the first information to the first terminal device through the unicast connection. The first terminal device is the foregoing relay terminal device, and the second terminal device is the foregoing remote terminal device.

Correspondingly, the first terminal device receives M pieces of first information of the M second terminal devices. The M pieces of first information of the M second terminal devices may be received by the first terminal device at a time, or may be received by the first terminal device for a plurality of times. The M pieces of first information are in a one-to-one correspondence with the M second terminal devices. That is, each of the M second terminal devices sends one piece of first information to the first terminal device. M is an integer greater than 1.

In some implementations, the second terminal device may directly send the first information to the first terminal device. In other implementations, the second terminal device may send the first information to the first terminal device through a network device. To be specific, the second terminal device may send the first information to the first terminal device, the first terminal device may forward the received first information to the network device, and the network device may send the first information and information about the second terminal device corresponding to the first information to the first terminal device. The information about the second terminal device may be an identifier allocated by the second terminal device, for example, an L2 identifier allocated by the second terminal device to an SL unicast connection between the second terminal device and the first terminal device; or may be an identifier allocated by the first terminal device to the second terminal device, for example, a local identifier or index, and may uniquely identify one second terminal device within a scope of the first terminal device; or may be an identifier allocated by a base station to the second terminal device, for example, a C-RNTI.

Correspondingly, in some implementations, the first terminal device may receive the M pieces of first information from the M second terminal devices. In another implementation, the first terminal device may receive the M pieces of first information from the M second terminal devices of the network device, where the M pieces of first information are sent by the M second terminal devices to the network device through a same first terminal device.

The information about the service may be a service name, or may be a TMGI of the service, or may be other information that may be used to uniquely identify the service.

1002: The first terminal device sends a first identifier and information about a first service corresponding to the first identifier to each of N second terminal devices.

After receiving the M pieces of first information of the M second terminal devices, the first terminal device may send the first identifier and the information about the first service corresponding to the first identifier to each of the N second terminal devices. Correspondingly, the second terminal device receives, from the first terminal device, the first identifier and the information about the first service corresponding to the first identifier, and may receive data of at least one common service from the first terminal device in a multicast mode based on the first identifier. The M second terminal devices may include the N second terminal devices, the first identifier is a group identifier of a corresponding group, the first identifier corresponds to third information, and the third information includes information about the at least one common service. The common service may be a common first service in at least N first services, or may be understood as a service that all the N second terminal devices are interested in. The at least N first services are in a one-to-one correspondence with the N second terminal devices. The information about the first service corresponding to the first identifier is information included in the third information, and N is an integer greater than 1 and less than or equal to M. The information about the service herein may be the same as or different from the information about the service in step 1001. The information about the service herein may include indication information of the service, for example, the TMGI or other service identifier information, and may further include an identifier used when UE receives service data, for example, a G-RNTI. When the service included in the third information is an MBS, the information about the service may also include an MBS session identifier.

Optionally, after receiving the M pieces of first information of the M second terminal devices, the first terminal device may first create at least one group. The first terminal device may first determine the at least one group based on the M pieces of first information of the M second terminal devices, and then may allocate the first identifier to each of the at least one group. Each of the at least one group corresponds to one piece of second information, one piece of third information, and one first identifier. A manner in which the first terminal device determines the at least one group is the same as a manner in which the network device determines the at least one group. For detailed descriptions, refer to step 702. A manner in which the first terminal device separately allocates the first identifier to the at least one group is similar to a manner in which the first terminal device allocates the first identifier to each of at least one piece of group information, but information carried in second indication information may be different. For example, the second indication information may carry at least one piece of third information, or may carry at least one piece of third information and at least one piece of second information. For detailed descriptions, refer to step 703. For detailed descriptions of the second information, refer to the descriptions of step 701.

In some implementations, the first terminal device may send the at least one piece of group information to the network device. Correspondingly, the network device may receive the at least one piece of group information from the first terminal device. The at least one piece of group information is in a one-to-one correspondence with the at least one group, and the group information may include the third information. After receiving the at least one piece of group information from the first terminal device, the network device may configure a multicast configuration for each of the at least one piece of group information, where the multicast configuration may include a first SL bearer configuration; and then may send the multicast configuration corresponding to each of the at least one piece of group information to the first terminal device. After receiving the multicast configuration from the network device, the first terminal device may establish a first SL bearer based on the first SL bearer configuration, so that the first terminal device may subsequently send the data of the at least one common service to the corresponding second terminal device through the first SL bearer. For detailed descriptions, refer to step 703.

Optionally, the at least one piece of group information sent by the first terminal device to the network device may further include the first identifier, that is, report the group identifier to the network device. The at least one piece of group information sent by the first terminal device to the network device may further include the second information. After receiving the at least one piece of group information, the network device may store the at least one piece of group information, for subsequent invocation. For example, when there is another second terminal device subsequently interested in the service included in the third information, the network device may update the group information and the corresponding first identifier that are sent to the first terminal device, so that the first terminal device may add a new second terminal device to an existing multicast group.

In other implementations, after creating the at least one group, the first terminal device may send the at least one piece of third information to the network device. After receiving the at least one piece of third information, the network device may allocate a first SL bearer configuration to each of the at least one piece of third information, and send the first SL bearer configuration corresponding to each of the at least one piece of third information to the first terminal device. After receiving the first SL bearer configuration corresponding to each of the at least one piece of third information from the network device, the first terminal device may establish a first SL bearer based on the first SL bearer configuration, so that the first terminal device may subsequently send the data of the at least one common service to the corresponding second terminal device through the first SL bearer. For detailed descriptions, refer to step 703.

In still another implementation, because there is a default configuration of a multicast configuration, after creating the at least one group, the first terminal device may directly configure the multicast configuration without obtaining the multicast configuration from the network device.

In yet another implementation, after creating the at least one group, the first terminal device may directly configure a multicast configuration, and may perform the configuration based on an SL resource pool.

Optionally, the first terminal device may send a second SL bearer configuration to each of the N second terminal devices, and the second terminal device receives the second SL bearer configuration from the first terminal device, and establishes a second SL bearer based on the second SL bearer configuration, so that the second terminal device may receive the data of the at least one common service from the first terminal device through the second SL bearer. For detailed descriptions, refer to step 704.

Figure 11A:
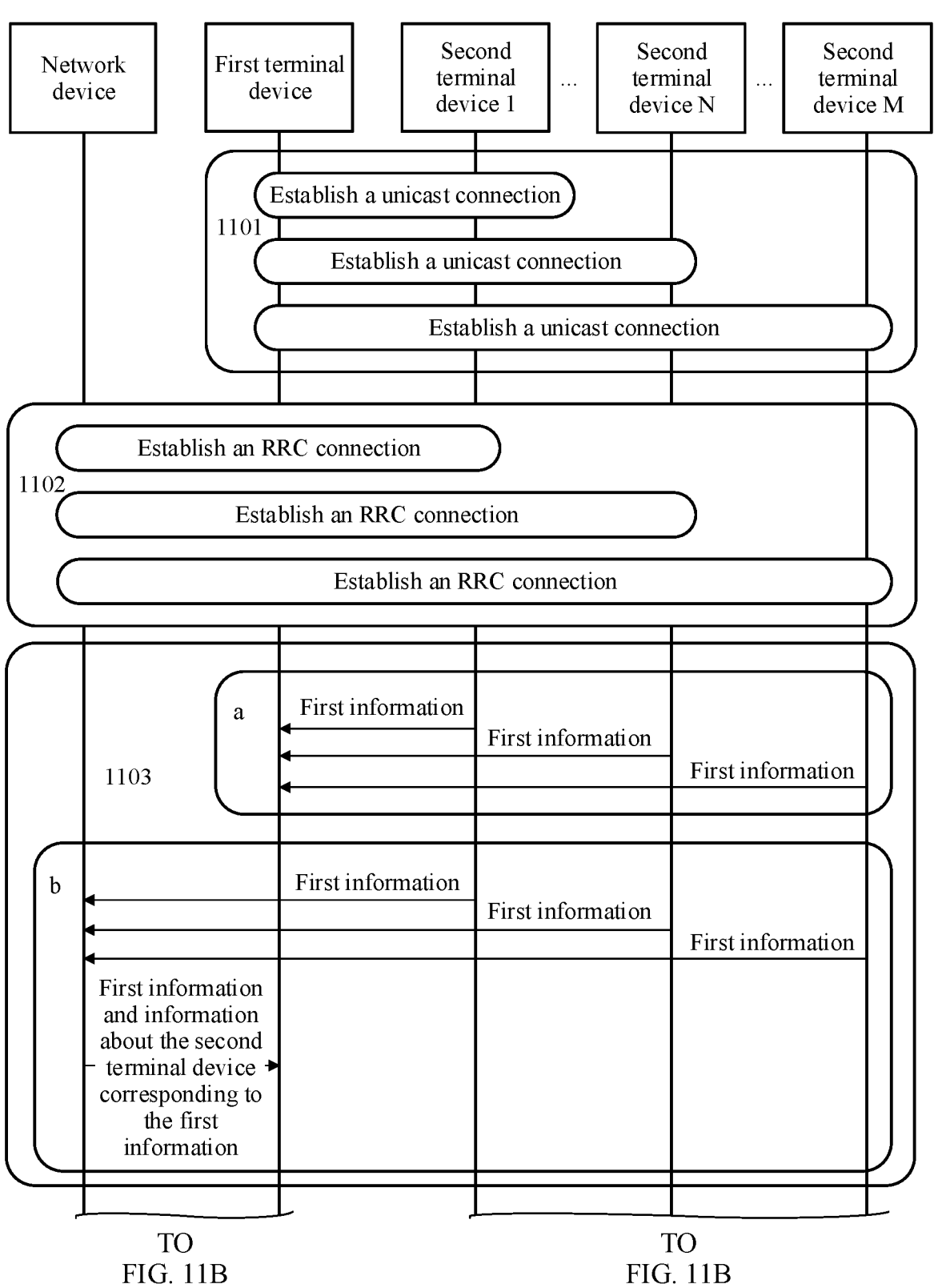
FIG. 11A and FIG. 11B are a schematic flowchart of still another communication method according to an embodiment of the present disclosure.
Figure 11B:
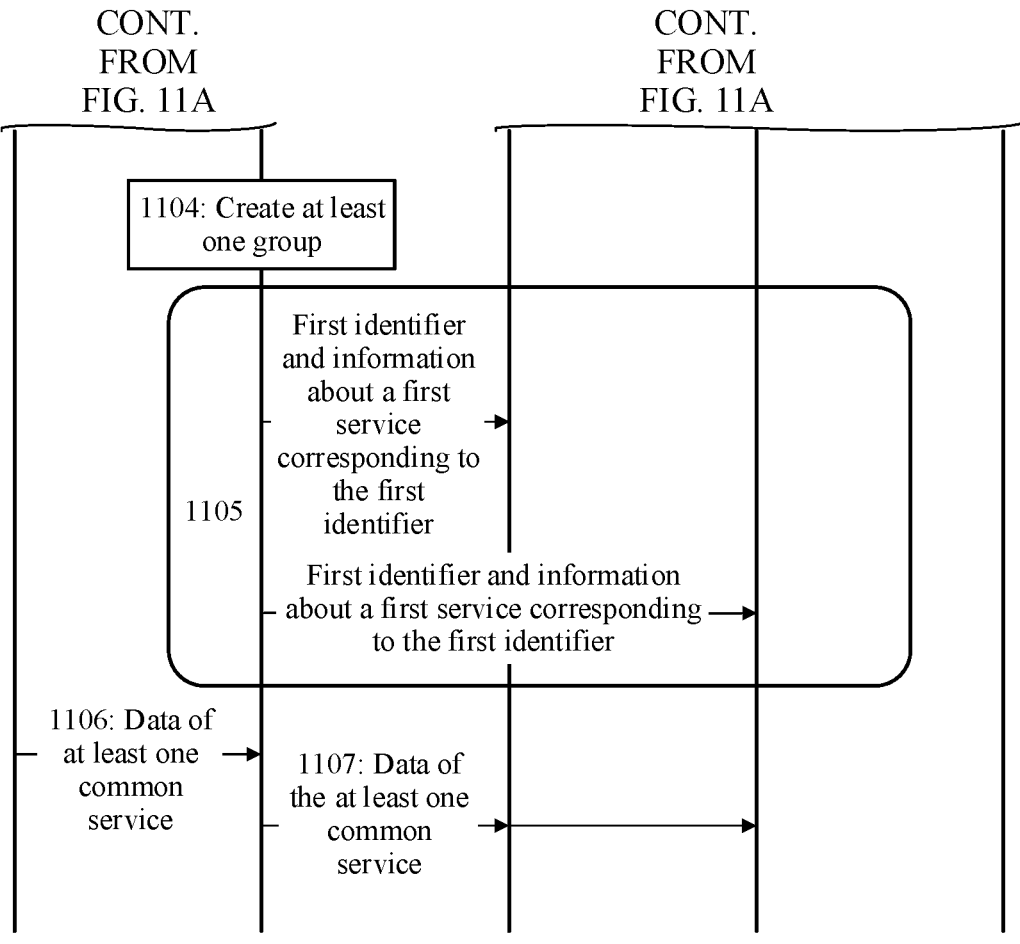

Based on the foregoing network architecture, FIG. 11A and FIG. 11B are a schematic flowchart of still another communication method according to an embodiment of the present disclosure. As shown in FIG. 11A and FIG. 11B, the communication method may include the following steps.

1101: A second terminal device establishes a unicast connection to a first terminal device.

For detailed descriptions of step 1101, refer to the descriptions of step 801. Details are not described herein again.

1102: The second terminal device establishes an RRC connection to a network device through the first terminal device.

For detailed descriptions of step 1102, refer to the descriptions of step 802. Details are not described herein again.

1103: M second terminal devices separately send first information to the first terminal device.

Step 1103 may include the following two implementations:

a: The second terminal device directly sends the first information to the first terminal device.

b: The second terminal device sends the first information to the network device through the first terminal device, and the network device sends, to the first terminal device, the first information and information about the second terminal device corresponding to the first information.

For detailed descriptions of step 1103, refer to the descriptions of step 1001. Details are not described herein again.

1104: The first terminal device creates at least one group.

For detailed descriptions of step 1104, refer to the descriptions of step 1002. Details are not described herein again.

1105: The first terminal device sends a first identifier and information about a first service corresponding to the first identifier to each of N second terminal devices.

For detailed descriptions of step 1105, refer to the descriptions of step 1002. Details are not described herein again.

1106: The network device sends data of at least one common service to the first terminal device.

For detailed descriptions of step 1106, refer to the descriptions of step 807. Details are not described herein again.

1107: The first terminal device sends the data of the at least one common service to the N second terminal devices in a multicast mode.

For detailed descriptions of step 1107, refer to the descriptions of step 808. Details are not described herein again.

It should be understood that related content in the foregoing several method embodiments may be mutually referenced.

Figures 12, 13:
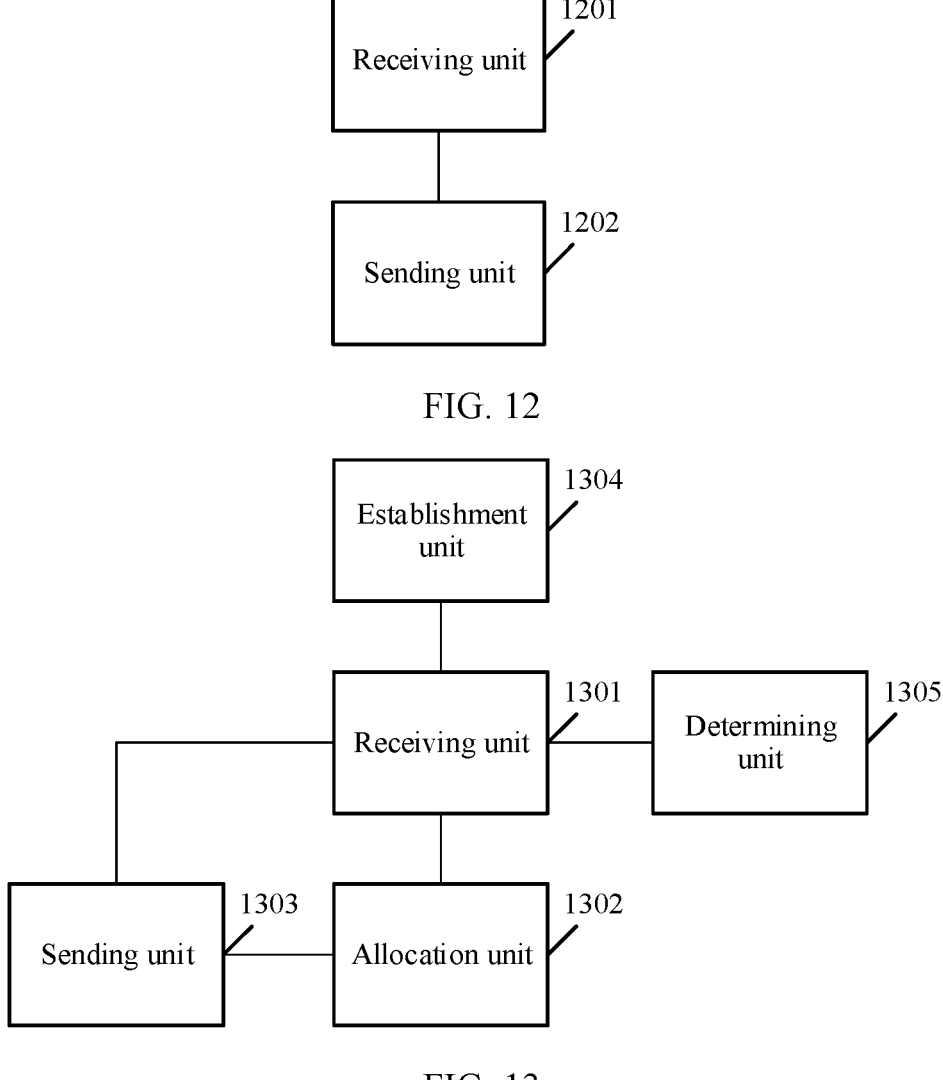
FIG. 12 is a schematic diagram of a structure of a communication apparatus according to an embodiment of the present disclosure.
FIG. 13 is a schematic diagram of a structure of another communication apparatus according to an embodiment of the present disclosure.

Based on the foregoing network architecture, FIG. 12 is a schematic diagram of a structure of a communication apparatus according to an embodiment of the present disclosure. As shown in FIG. 12, the communication apparatus may include: a receiving unit 1201, configured to receive M pieces of first information from M second terminal devices of a first terminal device, where the M pieces of first information are in a one-to-one correspondence with the M second terminal devices, the first information corresponds to at least one first service, the at least one first service is a service that the second terminal device is interested in, and M is an integer greater than 1; and a sending unit 1202, configured to send at least one piece of group information to the first terminal device, where the group information includes second information and third information, the second information includes information about N second terminal devices in the M second terminal devices, the third information includes information about at least one common service, the common service is a common first service in at least N first services, and N is an integer greater than 1 and less than or equal to M.

In an embodiment, the group information further includes an air interface bearer configuration and/or an air interface physical resource configuration, the air interface bearer configuration is used to establish an air interface bearer, the air interface bearer is used to receive data of the at least one common service, and the air interface physical resource configuration is used to receive the data of the at least one common service.

In an embodiment, the group information further includes a multicast configuration, the multicast configuration includes a first SL bearer configuration, the first SL bearer configuration is used to establish a first SL bearer, and the first SL bearer is used to send the data of the at least one common service.

In an embodiment, when the third information includes information about a plurality of common services, that the first SL bearer configuration is used to establish a first SL bearer includes:

The first SL bearer configuration is used to establish a plurality of first SL bearers; and that the first SL bearer is used to send the data of the at least one common service includes: each of the plurality of first SL bearers is used to send data of one of at least one common service.

In an embodiment, the receiving unit 1201 is further configured to receive first indication information from the first terminal device, where the first indication information is used to indicate a correspondence between the group information and a first identifier, and the first identifier is a group identifier.

In an embodiment, the sending unit 1202 is further configured to send, through the first terminal device, the first identifier and information about a first service corresponding to the first identifier to each of the N second terminal devices.

In an embodiment, the at least one common service belongs to an MBS.

For more detailed descriptions of the receiving unit 1201 and the sending unit 1202, directly refer to the related descriptions of the network device in the method embodiments shown in FIG. 7 and FIG. 8A and FIG. 8B. Details are not described herein again.

The foregoing at least one common service may be an MBS, or may be another service. This is not limited herein.

Based on the foregoing network architecture, FIG. 13 is a schematic diagram of a structure of another communication apparatus according to an embodiment of the present disclosure. As shown in FIG. 13, the communication apparatus may include: a receiving unit 1301, configured to receive at least one piece of group information from a network device, where the group information includes second information and third information, the second information includes information about N second terminal devices, the third information includes information about at least one common service, the N second terminal devices are in a one-to-one correspondence with N pieces of first information, the first information corresponds to at least one first service, the at least one first service is a service that the second terminal device is interested in, the common service is a common first service in at least N first service, and Nis an integer greater than 1; an allocation unit 1302, configured to allocate a first identifier to each of the at least one piece of group information, where the first identifier is a group identifier; and a sending unit 1303, configured to send the first identifier and information about a first service corresponding to the first identifier to each of the N second terminal devices.

In an embodiment, the group information further includes an air interface bearer configuration and/or an air interface physical resource configuration, and the communication apparatus may further include: an establishment unit 1304, configured to establish an air interface bearer based on the air interface bearer configuration, where the receiving unit 1301 is further configured to receive data of the at least one common service from the network device through the air interface bearer; and a determining unit 1305, configured to determine a physical resource based on the air interface physical resource configuration, where the receiving unit 1301 is further configured to receive the data of the at least one common service from the network device through the physical resource.

In an embodiment, the group information further includes a multicast configuration, the multicast configuration includes a first SL bearer configuration, and the establishment unit 1304 is further configured to establish a first SL bearer based on the first SL bearer configuration, where the first SL bearer is used to send the data of the at least one common service.

In an embodiment, when the third information includes information about a plurality of common services, that the establishment unit 1304 establishes a first SL bearer based on the first SL bearer configuration includes: establishing a plurality of first SL bearers based on the first SL bearer configuration; and that the first SL bearer is used to send the data of the at least one common service includes: each of the plurality of first SL bearers is used to send data of one of at least one common service.

In an embodiment, the sending unit 1303 is further configured to send a second SL bearer configuration to each of the N second terminal devices, where the second SL bearer configuration is used to establish a second SL bearer, the second SL bearer is used to receive the data of the at least one common service, and the first SL bearer configuration includes the second SL bearer configuration.

In an embodiment, the allocation unit 1302 is configured to: send second indication information to an upper layer through an AS, where the second indication information is used to request the upper layer to allocate a group identifier; and allocate the first identifier through the upper layer based on the second indication information.

In an embodiment, the sending unit 1303 is further configured to send first indication information to the network device, where the first indication information is used to indicate a correspondence between the group information and the first identifier.

In an embodiment, that the sending unit 1303 sends the first identifier and information about a first service corresponding to the first identifier to each of the N second terminal devices includes: sending first indication information to the network device, where the first indication information is used to indicate a correspondence between the group information and the first identifier, and the first indication information is used by the network device to send, through the first terminal device, the first identifier and the information about the first service corresponding to the first identifier to each of the N second terminal devices.

In an embodiment, the at least one common service belongs to an MBS.

For more detailed descriptions of the receiving unit 1301, the allocation unit 1302, the sending unit 1303, the establishment unit 1304, and the determining unit 1305, directly refer to the related descriptions of the first terminal device in the method embodiments shown in FIG. 7 and FIG. 8A and FIG. 8B. Details are not described herein again.

Figures 14, 15:
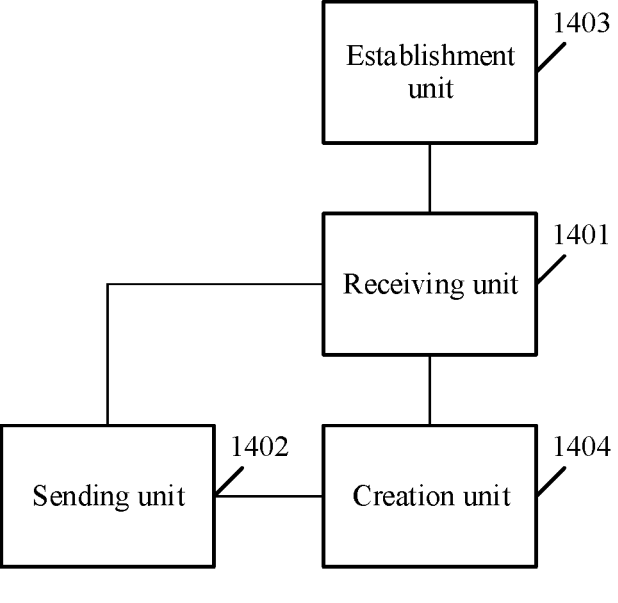
FIG. 14 is a schematic diagram of a structure of still another communication apparatus according to an embodiment of the present disclosure.
FIG. 15 is a schematic diagram of a structure of still another communication apparatus according to an embodiment of the present disclosure.

Based on the foregoing network architecture, FIG. 14 is a schematic diagram of a structure of still another communication apparatus according to an embodiment of the present disclosure. As shown in FIG. 14, the communication apparatus may include: a receiving unit 1401, configured to receive M pieces of first information of M second terminal devices, where the M pieces of first information are in a one-to-one correspondence with the M second terminal devices, the first information corresponds to at least one first service, the at least one first service is a service that the second terminal device is interested in, and M is an integer greater than 1; and a sending unit 1402, configured to send a first identifier and information about a first service corresponding to the first identifier to each of N second terminal devices, where the M second terminal devices include the N second terminal devices, the first identifier is a group identifier of a corresponding group, the first identifier corresponds to third information, the third information includes information about at least one common service, the common service is a common first service in at least N first services, the information about the first service corresponding to the first identifier is the information included in the third information, and Nis an integer greater than 1 and less than or equal to M.

In an embodiment, the receiving unit 1401 is configured to: receive the M pieces of first information from the M second terminal devices; or receive the M pieces of first information from the M second terminal devices of a network device, where the M pieces of first information are sent by the M second terminal devices to the network device through a same first terminal device.

In an embodiment, the sending unit 1402 is further configured to send at least one piece of group information to a network device, where the group information includes the third information; and the receiving unit 1401 is further configured to receive a multicast configuration corresponding to each of the at least one piece of group information from the network device, where the multicast configuration includes a first SL bearer configuration; and the communication apparatus may further include: an establishment unit 1403, configured to establish a first SL bearer based on the first SL bearer configuration, where the first SL bearer is used to send data of the at least one common service.

In an embodiment, when the third information includes information about a plurality of common services, the establishment unit 1403 is configured to establish a plurality of first SL bearers based on the first SL bearer configuration; and that the first SL bearer is used to send data of the at least one common service includes: each of the plurality of first SL bearers is used to send data of one of at least one common service.

In an embodiment, the sending unit 1402 is further configured to send a second SL bearer configuration to each of the N second terminal devices, where the second SL bearer configuration is used to establish a second SL bearer, the second SL bearer is used to receive the data of the at least one common service, and the first SL bearer configuration includes the second SL bearer configuration.

In an embodiment, the group information further includes the first identifier.

In an embodiment, the communication apparatus may further include: a creation unit 1404, configured to create at least one group.

In an embodiment, the creation unit 1404 is configured to: determine at least one group; and allocate the first identifier to each of the at least one group.

In an embodiment, that the creation unit 1404 allocates the first identifier to each of the at least one group includes: sending second indication information to an upper layer through an AS, where the second indication information is used to request the upper layer to allocate a group identifier; and allocating the first identifier through the upper layer based on the second indication information.

In an embodiment, the at least one common service belongs to an MBS.

For more detailed descriptions of the receiving unit 1401, the sending unit 1402, the establishment unit 1403, and the creation unit 1404, directly refer to the related descriptions of the first terminal device in the method embodiments shown in FIG. 10 and FIG. 11A and FIG. 11B. Details are not described herein again.

Based on the foregoing network architecture, FIG. 15 is a schematic diagram of a structure of still another communication apparatus according to an embodiment of the present disclosure. As shown in FIG. 15, the communication apparatus may include: a receiving unit 1501, configured to receive at least one piece of group information from a first terminal device, where the group information includes third information, the third information includes information about at least one common service, N second terminal devices are in a one-to-one correspondence with N pieces of first information, the first information corresponds to at least one first service, the at least one first service is a service that the second terminal device is interested in, the common service is a common first service in at least N first services, and N is an integer greater than 1; and a sending unit 1502, configured to send a multicast configuration corresponding to each of the at least one piece of group information to the first terminal device, where the multicast configuration includes a first SL bearer configuration, the first SL bearer configuration is used to establish a first SL bearer, and the first SL bearer is used to send data of the at least one common service.

In an embodiment, when the third information includes information about a plurality of common services, that the first SL bearer configuration is used to establish a first SL bearer includes:

The first SL bearer configuration is used to establish a plurality of first SL bearers; and that the first SL bearer is used to send data of the at least one common service includes: each of the plurality of first SL bearers is used to send data of one of at least one common service.

In an embodiment, the receiving unit 1501 is further configured to: before receiving the at least one piece of group information from the first terminal device, receive M pieces of first information sent by M second terminal devices through the first terminal device, where the M pieces of first information are in a one-to-one correspondence with the M second terminal devices, the M second terminal devices include the N second terminal devices, and M is an integer greater than or equal to N; and the sending unit 1502 is further configured to send the M pieces of first information to the first terminal device.

In an embodiment, the group information further includes a first identifier, the first identifier is used to identify a group corresponding to the group information, and the first identifier is a group identifier.

In an embodiment, the at least one common service belongs to an MBS.

For more detailed descriptions of the receiving unit 1501 and the sending unit 1502, directly refer to the related descriptions of the network device in the method embodiments shown in FIG. 10 and FIG. 11A and FIG. 11B. Details are not described herein again.

Figure 16:
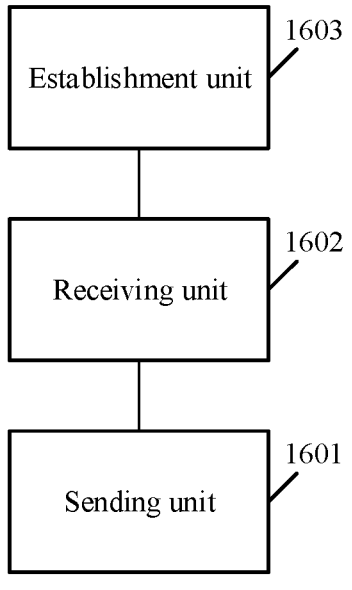
FIG. 16 is a schematic diagram of a structure of still another communication apparatus according to an embodiment of the present disclosure.

Based on the foregoing network architecture, FIG. 16 is a schematic diagram of a structure of still another communication apparatus according to an embodiment of the present disclosure. As shown in FIG. 16, the communication apparatus may include: a sending unit 1601, configured to send first information, where the first information corresponds to at least one first service, and the at least one first service is a service that a second terminal device is interested in; and a receiving unit 1602, configured to receive data of at least one common service from a first terminal device in a multicast mode based on a first identifier, where the first identifier corresponds to third information, the third information includes information about the at least one common service, N second terminal devices are in a one-to-one correspondence with N pieces of first information, the common service is a common first service in at least N first services, the N second terminal devices include the second terminal device, and the first identifier is a group identifier of a corresponding group.

In an embodiment, the receiving unit 1602 is further configured to receive the first identifier and information about a first service corresponding to the first identifier.

In an embodiment, the sending unit 1601 is configured to: send the first information to a network device through first terminal device; or send the first information to the first terminal device.

In an embodiment, that the receiving unit 1602 receives the first identifier and information about a first service corresponding to the first identifier includes: receiving, from the first terminal device in a unicast mode, the first identifier and the information about the first service corresponding to the first identifier; or receiving, from the network device through the first terminal device, the first identifier and the information about the first service corresponding to the first identifier.

In an embodiment, the receiving unit 1602 is further configured to receive a second SL bearer configuration from the first terminal device; and the communication apparatus may further include: an establishment unit 1603, configured to establish a second SL bearer based on the second SL bearer configuration; and that the receiving unit 1602 receives data of at least one common service from a first terminal device in a multicast mode based on a first identifier includes: receiving the data of the at least one common service from the first terminal device through the second SL bearer in the multicast mode based on the first identifier.

In an embodiment, when the third information includes information about a plurality of common services, the establishment unit 1603 is configured to establish a plurality of second SL bearers based on the second SL bearer configuration; and that the receiving unit 1602 receives the data of the at least one common service from the first terminal device through the second SL bearer in the multicast mode based on the first identifier includes: receiving data of one of the at least one common service from the first terminal device through one of the plurality of second SL bearers in the multicast mode based on the first identifier.

In an embodiment, the at least one common service belongs to an MBS.

For more detailed descriptions of the sending unit 1601, the receiving unit 1602, and the establishment unit 1603, directly refer to the related descriptions of the second terminal device in the method embodiments shown in FIG. 7, FIG. 8A and FIG. 8B, FIG. 10, and FIG. 11A and FIG. 11B. Details are not described herein again.

Figure 17:
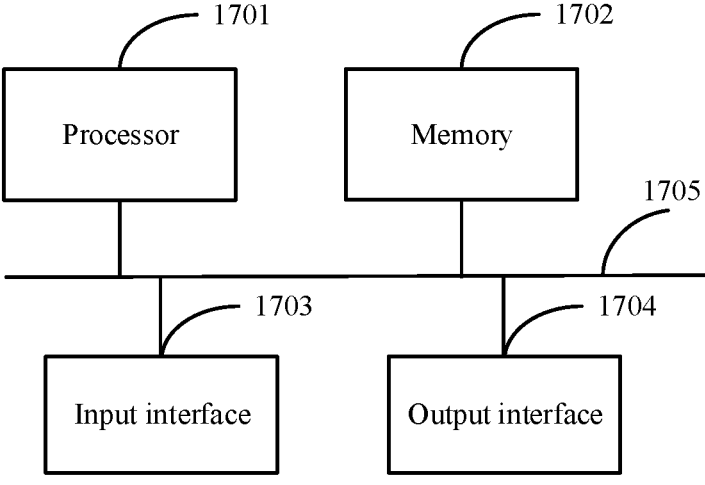
FIG. 17 is a schematic diagram of a structure of still another communication apparatus according to an embodiment of the present disclosure.

Based on the foregoing network architecture, FIG. 17 is a schematic diagram of a structure of still another communication apparatus according to an embodiment of the present disclosure. As shown in FIG. 17, the communication apparatus may include a processor 1701, a memory 1702, an input interface 1703, an output interface 1704, and a bus 1705. The memory 1702 may exist independently, and may be connected to the processor 1701 through the bus 1705. The memory 1702 may alternatively be integrated with the processor 1701. The bus 1705 is configured to implement connections between these components.

In an embodiment, the communication apparatus may be a network device or a module (for example, a chip) in the network device. When computer program instructions stored in the memory 1702 are executed, the processor 1701 is configured to control the receiving unit 1201 and the sending unit 1202 to perform the operations performed in the foregoing embodiments. The input interface 1703 is configured to perform the operations performed by the receiving unit 1201 in the foregoing embodiments. The output interface 1704 is configured to perform the operations performed by the sending unit 1202 in the foregoing embodiments. The network device or the module in the network device may be further configured to perform various methods performed by the network device in the method embodiments in FIG. 7 and FIG. 8A and FIG. 8B. Details are not described again.

In an embodiment, the communication apparatus may be a first terminal device or a module (for example, a chip) in the first terminal device. When computer program instructions stored in the memory 1702 are executed, the processor 1701 is configured to control the receiving unit 1301 and the sending unit 1303 to perform the operations performed in the foregoing embodiment. The processor 1701 is further configured to perform the operations performed by the allocation unit 1302, the establishment unit 1304, and the determining unit 1305 in the foregoing embodiment. The input interface 1703 is configured to perform the operations performed by the receiving unit 1301 in the foregoing embodiments. The output interface 1704 is configured to perform the operations performed by the sending unit 1303 in the foregoing embodiments. The first terminal device or the module in the first terminal device may be further configured to perform various methods performed by the first terminal device in the method embodiments in FIG. 7 and FIG. 8A and FIG. 8B. Details are not described again.

In an embodiment, the communication apparatus may be a first terminal device or a module (for example, a chip) in the first terminal device. When computer program instructions stored in the memory 1702 are executed, the processor 1701 is configured to control the receiving unit 1401 and the sending unit 1402 to perform the operations performed in the foregoing embodiment. The processor 1701 is further configured to perform the operations performed by the establishment unit 1403 and the creation unit 1404 in the foregoing embodiments. The input interface 1703 is configured to perform the operations performed by the receiving unit 1401 in the foregoing embodiments. The output interface 1704 is configured to perform the operations performed by the sending unit 1402 in the foregoing embodiments. The first terminal device or the module in the first terminal device may be further configured to perform various methods performed by the first terminal device in the method embodiments in FIG. 10 and FIG. 11A and FIG. 11B. Details are not described again.

In an embodiment, the communication apparatus may be a network device or a module (for example, a chip) in the network device. When computer program instructions stored in the memory 1702 are executed, the processor 1701 is configured to control the receiving unit 1501 and the sending unit 1502 to perform the operations performed in the foregoing embodiments. The input interface 1703 is configured to perform the operations performed by the receiving unit 1501 in the foregoing embodiments. The output interface 1704 is configured to perform the operations performed by the sending unit 1502 in the foregoing embodiment. The network device or the module in the network device may be further configured to perform various methods performed by the network device in the method embodiments in FIG. 10 and FIG. 11A and FIG. 11B. Details are not described again.

In an embodiment, the communication apparatus may be a second terminal device or a module (for example, a chip) in the second terminal device. When computer program instructions stored in the memory 1702 are executed, the processor 1701 is configured to control the sending unit 1601 and the receiving unit 1602 to perform the operations performed in the foregoing embodiments. The processor 1701 is further configured to perform the operations performed by the establishment unit 1603 in the foregoing embodiment. The input interface 1703 is configured to perform the operations performed by the receiving unit 1602 in the foregoing embodiment. The output interface 1704 is configured to perform the operations performed by the sending unit 1601 in the foregoing embodiment. The second terminal device or the module in the second terminal device may be further configured to perform various methods performed by the second terminal device in the method embodiments in FIG. 7, FIG. 8A and FIG. 8B, FIG. 10, and FIG. 11A and FIG. 11B. Details are not described again.

Figure 18:
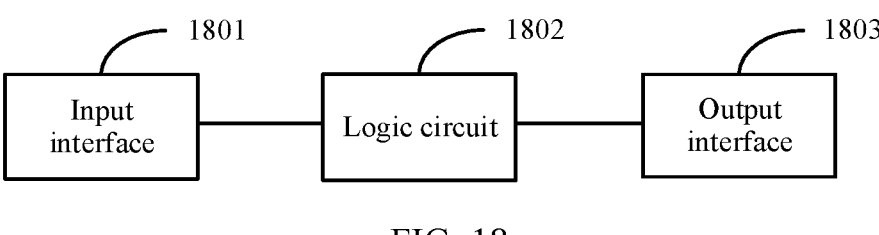
FIG. 18 is a schematic diagram of a structure of still another communication apparatus according to an embodiment of the present disclosure.

Based on the foregoing network architecture, FIG. 18 is a schematic diagram of a structure of still another communication apparatus according to an embodiment of the present disclosure. As shown in FIG. 18, the communication apparatus may include an input interface 1801, a logic circuit 1802, and an output interface 1803. The input interface 1801 is connected to the output interface 1803 through the logic circuit 1802. The input interface 1801 is configured to receive information from another communication apparatus, and the output interface 1803 is configured to output, schedule, or send information to another communication apparatus. The logic circuit 1802 is configured to perform an operation other than the operations performed by the input interface 1801 and the output interface 1803, for example, implement a function implemented by the processor 1701 in the foregoing embodiments. The communication apparatus may be a network device or a module in the network device, or may be a first terminal device or a module in the first terminal device, or may be a second terminal device or a module in the second terminal device. For more detailed descriptions of the input interface 1801, the logic circuit 1802, and the output interface 1803, directly refer to the related descriptions of the network device, the first terminal device, or the second terminal device in the foregoing method embodiments. Details are not described herein again.

An embodiment of the present disclosure further discloses a computer-readable storage medium. The computer-readable storage medium stores instructions. When the instructions are executed, the methods in the foregoing method embodiments are performed.

An embodiment of the present disclosure further discloses a computer program product including instructions. When the instructions are executed, the methods in the foregoing method embodiments are performed.

An embodiment of the present disclosure further discloses a communication system. The communication system includes a network device, a first terminal device, and a second terminal device. For specific descriptions, refer to the communication methods shown in FIG. 7, FIG. 8A and FIG. 8B, FIG. 10, and FIG. 11A and FIG. 11B.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A communication method, comprising:

receiving M pieces of first information of M first terminal devices, wherein the M pieces of first information are in a one-to-one correspondence with the M first terminal devices, the first information corresponds to at least one service, the at least one service is a service that a first terminal device of the M first terminal devices is interested in, and M is an integer greater than 1; and sending an identifier and information about a service corresponding to the identifier to each of N first terminal devices, wherein the M first terminal devices comprise the N first terminal devices, the identifier is a group identifier of a corresponding group, the identifier corresponds to second information, the second information comprises information about at least one common service, the at least one common service is a common service in at least N first services, the second information comprises the information about the service corresponding at the identifier, and N is an integer greater than 1 and less than or equal to M.

2. The method according to claim 1, wherein the receiving of M pieces of first information of M first terminal devices comprises:

receiving the M pieces of first information from the M first terminal devices; or receiving the M pieces of first information from the M first terminal devices of a network device, wherein the M pieces of first information are sent by the M first terminal devices to the network device through a same second terminal device.

3. The method according to claim 1, wherein the method further comprises:

sending at least one piece of group information to a network device, wherein the at least one piece of group information comprises the second information;

receiving a multicast configuration corresponding to each of the at least one piece of group information from the network device, wherein the multicast configuration comprises a first sidelink (SL) bearer configuration; and establishing a first SL bearer based on the first SL bearer configuration, wherein the first SL bearer is used to send data of the at least one common service.

4. The method according to claim 3, wherein when the second information comprises information about a plurality of common services, the establishing of the first SL bearer based on the first SL bearer configuration comprises:

establishing a plurality of first SL bearers based on the first SL bearer configuration; and that the first SL bearer is used to send the data of the at least one common service comprises:

each of the plurality of first SL bearers is used to send data of one of the at least one common service.

5. The method according to claim 3, wherein the method further comprises:

sending a second SL bearer configuration to each of the N first terminal devices, wherein the second SL bearer configuration is used to establish a second SL bearer, the second SL bearer is used to receive the data of the at least one common service, and the first SL bearer configuration comprises the second SL bearer configuration.

6. The method according to claim 3, wherein the group information further comprises the identifier.

7. The method according to claim 1, wherein the method further comprises: creating at least one group.

8. A communication apparatus, comprising a processor, a memory, and the processor invokes a computer program stored in the memory, and when the computer program is executed by the processor, the apparatus is enabled to perform:

receiving M pieces of first information of M first terminal devices, wherein the M pieces of first information are in a one-to-one correspondence with the M first terminal devices, the first information corresponds to at least one service, the at least one service is a service that a first terminal device of the M first terminal devices is interested in, and M is an integer greater than 1; and sending an identifier and information about a service corresponding to the identifier to each of N first terminal devices, wherein the M first terminal devices comprise the N first terminal devices, the identifier is a group identifier of a corresponding group, the identifier corresponds to second information, the second information comprises information about at least one common service, the common service is a common service in at least N first-services, the information about the service corresponding to the identifier is the information comprised in the second information, and Nis an integer greater than 1 and less than or equal to M.

9. The apparatus according to claim 8, wherein when the computer program is executed by the processor, the apparatus is enabled to perform:

receiving the M pieces of first information from the M first terminal devices; or receiving the M pieces of first information from the M first terminal devices of a network device, wherein the M pieces of first information are sent by the M first terminal devices to the network device through a same second terminal device.

10. The apparatus according to claim 8, wherein when the computer program is executed by the processor, the apparatus is enabled to perform:

sending at least one piece of group information to a network device, wherein the group information comprises the second information;

receiving a multicast configuration corresponding to each of the at least one piece of group information from the network device, wherein the multicast configuration comprises a first sidelink (SL) bearer configuration; and establishing a first SL bearer based on the first SL bearer configuration, wherein the first SL bearer is used to send data of the at least one common service.

11. The apparatus according to claim 10, wherein when the computer program is executed by the processor, the apparatus is enabled to perform:

establishing a plurality of first SL bearers based on the first SL bearer configuration; and that the first SL bearer is used to send the data of the at least one common service comprises:

each of the plurality of first SL bearers is used to send data of one of the at least one common service.

12. The apparatus according to claim 10, wherein when the computer program is executed by the processor, the apparatus is enabled to perform:

sending a second SL bearer configuration to each of the N first terminal devices, wherein the second SL bearer configuration is used to establish a second SL bearer, the second SL bearer is used to receive the data of the at least one common service, and the first SL bearer configuration comprises the second SL bearer configuration.

13. The apparatus according to claim 10, wherein the group information further comprises the identifier.

14. A non-transitory computer-readable storage medium, wherein the non-transitory computer-readable storage medium stores a computer program or computer instructions; and when the computer program or the computer instructions are run, the non-transitory computer-readable storage medium is enabled to perform operations comprising: receiving M pieces of first information of first terminal devices, wherein the M pieces of first information are in a one-to-one correspondence with the M first terminal devices, the first information corresponds to at least one service, the at least one service is a service that a first terminal device of the M first terminal devices is interested in, and M is an integer greater than 1; and sending an identifier and information about a service corresponding to the identifier to each of N first terminal devices, wherein the M first terminal devices comprise the N first terminal devices, the identifier is a group identifier of a corresponding group, the identifier corresponds to second information, the second information comprises information about at least one common service, the common service is a common service in at least N services, the information about the service corresponding to the identifier is the information comprised in the second information, and N is an integer greater than 1 and less than or equal to M.

15. The non-transitory computer-readable storage medium according to claim 14, wherein when the computer program or the computer instructions are run, the non-transitory computer-readable storage medium is enabled to perform operations comprising: receiving the M pieces of first information from the M first terminal devices; or receiving the M pieces of first information from the M first terminal devices of a network device, wherein the M pieces of first information are sent by the M first terminal devices to the network device through a same second terminal device.

16. The non-transitory computer-readable storage medium according to claim 14, wherein when the computer program or the computer instructions are run, the non-transitory computer-readable storage medium is enabled to perform operations comprising: sending at least one piece of group information to a network device, wherein the group information comprises the second information; receiving a multicast configuration corresponding to each of the at least one piece of group information from the network device, wherein the multicast configuration comprises a first sidelink (SL) bearer configuration; and establishing a first SL bearer based on the first SL bearer configuration, wherein the first SL bearer is used to send data of the at least one common service.

17. The non-transitory computer-readable storage medium according to claim 16, wherein when the computer program or the computer instructions are run, the non-transitory computer-readable storage medium is enabled to perform operations comprising: establishing a plurality of first SL bearers based on the first SL bearer configuration; and that the first SL bearer is used to send the data of the at least one common service comprises: each of the plurality of first SL bearers is used to send data of one of the at least one common service.

18. The non-transitory computer-readable storage medium according to claim 16, wherein when the computer program or the computer instructions are run, the non-transitory computer-readable storage medium is enabled to perform operations comprising: sending a second SL bearer configuration to each of the N first terminal devices, wherein the second SL bearer configuration is used to establish a second SL bearer, the second SL bearer is used to receive the data of the at least one common service, and the first SL bearer configuration comprises the second SL bearer configuration.

19. The non-transitory computer-readable storage medium according to claim 16, wherein the group information further comprises the identifier.

20. The non-transitory computer-readable storage medium according to claim 14, wherein when the computer program or the computer instructions are run, the non-transitory computer-readable storage medium is enabled to perform operations comprising: creating at least one group.

\* \* \* \* \*